(12) United States Patent
Kumar

(10) Patent No.: US 12,131,418 B2
(45) Date of Patent: Oct. 29, 2024

(54) GRAPHICS PROCESSING UNIT INSTANCING CONTROL

(71) Applicant: Adobe Inc., San Jose, CA (US)

(72) Inventor: Harish Kumar, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/741,976

(22) Filed: May 11, 2022

(65) Prior Publication Data

US 2023/0368454 A1 Nov. 16, 2023

(51) Int. Cl.
*G06T 15/00* (2011.01)
*G06T 17/20* (2006.01)

(52) U.S. Cl.
CPC ............ *G06T 15/005* (2013.01); *G06T 17/20* (2013.01)

(58) Field of Classification Search
CPC ............... G06T 15/005; G06T 17/20
See application file for complete search history.

(56) References Cited

U.S. PATENT DOCUMENTS

| | | |
|---|---|---|
| 5,864,342 A | 1/1999 | Kajiya et al. |
| 5,982,384 A | 11/1999 | Prouty et al. |
| 6,515,668 B1 | 2/2003 | Bruijns et al. |
| 6,577,307 B1 | 6/2003 | Hsiao et al. |
| 7,167,185 B1 | 1/2007 | Min et al. |
| 7,567,248 B1 | 7/2009 | Mark et al. |
| 7,605,825 B1 | 10/2009 | Lau et al. |
| 7,868,887 B1 | 1/2011 | Yhann |
| 7,928,984 B1 | 4/2011 | Yhann et al. |
| 7,952,580 B1 | 5/2011 | Yhann et al. |
| 8,035,641 B1 | 10/2011 | O'Donnell |
| 8,044,955 B1 | 10/2011 | Yhann |
| 8,237,710 B1 | 8/2012 | Marketsmueller |
| 8,624,911 B1 | 1/2014 | Miller |
| 8,681,154 B1 | 3/2014 | Gardiner |
| 9,619,937 B2 | 4/2017 | Persson et al. |
| 10,482,577 B2 | 11/2019 | Beri et al. |
| 11,361,405 B2 | 6/2022 | Beri et al. |
| 11,417,058 B2 | 8/2022 | Kumar et al. |

(Continued)

FOREIGN PATENT DOCUMENTS

| | | |
|---|---|---|
| GB | 2351217 A | 12/2000 |
| GB | 2580166 A | 7/2020 |
| GB | 2598022 A | 2/2022 |

OTHER PUBLICATIONS

"Barycentric Interpolation", Retrieved at: https://classes.soe.ucsc.edu/cmps160/Fall10/resources/barycentricInterpolation.pdf—on May 20, 2016, 18 pages.

(Continued)

*Primary Examiner* — Michelle Chin
(74) *Attorney, Agent, or Firm* — FIG. 1 Patents

(57) ABSTRACT

Graphics processing unit instancing control techniques are described that overcome conventional challenges to expand functionality made available via a graphics processing unit. In one example, these techniques support ordering of primitives within respective instances of a single draw call made to a graphics processing unit. This is performed by ordering primitives within respective instances that correspond to polygons for rendering. The ordering of the primitives overcomes limitations of conventional techniques and reduces visual artifacts through support of correct overlaps and z-ordering of instances.

20 Claims, 16 Drawing Sheets

(56) References Cited

U.S. PATENT DOCUMENTS

| | | | |
|---|---|---|---|
| 2002/0101435 A1 | 8/2002 | Sasaki et al. | |
| 2003/0193506 A1* | 10/2003 | Movshovich | G06T 15/005 345/629 |
| 2003/0206168 A1 | 11/2003 | Kejser et al. | |
| 2003/0210251 A1 | 11/2003 | Brown | |
| 2004/0135795 A1 | 7/2004 | Raubacher et al. | |
| 2004/0211071 A1* | 10/2004 | Su | G06T 15/40 33/1 AP |
| 2004/0263516 A1 | 12/2004 | Michail et al. | |
| 2005/0190179 A1 | 9/2005 | Hong et al. | |
| 2005/0206657 A1 | 9/2005 | Arcas | |
| 2006/0269116 A1 | 11/2006 | Makarovic et al. | |
| 2007/0046687 A1 | 3/2007 | Soroushi et al. | |
| 2007/0070071 A1 | 3/2007 | Terazono et al. | |
| 2007/0153022 A1 | 7/2007 | Keshet | |
| 2008/0225042 A1 | 9/2008 | Birtwistle et al. | |
| 2008/0282175 A1* | 11/2008 | Costin | G06F 16/972 715/760 |
| 2008/0309676 A1 | 12/2008 | Nehab et al. | |
| 2009/0058880 A1 | 3/2009 | Tremblay | |
| 2009/0079764 A1 | 3/2009 | Lin et al. | |
| 2009/0237406 A1 | 9/2009 | Chen et al. | |
| 2011/0285736 A1 | 11/2011 | Kilgard | |
| 2011/0285747 A1 | 11/2011 | Kilgard | |
| 2011/0300936 A1 | 12/2011 | Matsumiya et al. | |
| 2012/0069037 A1 | 3/2012 | Ziemski | |
| 2013/0113794 A1 | 5/2013 | Ishibashi | |
| 2013/0249897 A1 | 9/2013 | Dunaisky et al. | |
| 2013/0321399 A1 | 12/2013 | Rohlf | |
| 2014/0098117 A1* | 4/2014 | Goel | G06T 15/005 345/522 |
| 2014/0125669 A1 | 5/2014 | Kilgariff et al. | |
| 2014/0146042 A1* | 5/2014 | Park | G06T 15/40 345/419 |
| 2014/0204080 A1 | 7/2014 | Goel et al. | |
| 2014/0267266 A1 | 9/2014 | Crassin et al. | |
| 2014/0300619 A1 | 10/2014 | Hasselgren et al. | |
| 2014/0320527 A1 | 10/2014 | Cohen et al. | |
| 2015/0015575 A1* | 1/2015 | Gierach | G06T 17/20 345/420 |
| 2015/0023595 A1 | 1/2015 | Perry et al. | |
| 2015/0062140 A1 | 3/2015 | Levantovsky et al. | |
| 2015/0084981 A1 | 3/2015 | Clarberg | |
| 2015/0145880 A1 | 5/2015 | Smith et al. | |
| 2015/0178961 A1 | 6/2015 | Karras | |
| 2015/0178974 A1 | 6/2015 | Goel et al. | |
| 2015/0193965 A1 | 7/2015 | Chen et al. | |
| 2015/0288888 A1 | 10/2015 | Alsheuski | |
| 2016/0364845 A1 | 12/2016 | Sathe et al. | |
| 2016/0379342 A1 | 12/2016 | Lee et al. | |
| 2017/0076470 A1 | 3/2017 | Yoo et al. | |
| 2018/0033168 A1* | 2/2018 | Beri | G06T 3/4084 |
| 2019/0318527 A1 | 10/2019 | Nijasure et al. | |
| 2019/0371042 A1* | 12/2019 | Labbe | G06T 15/005 |
| 2020/0020481 A1 | 1/2020 | Wang et al. | |
| 2020/0034950 A1 | 1/2020 | Beri et al. | |
| 2021/0027533 A1 | 1/2021 | Ruud et al. | |
| 2021/0398349 A1 | 12/2021 | Achrenius et al. | |
| 2022/0084283 A1 | 3/2022 | Kumar et al. | |

OTHER PUBLICATIONS

"Final Office Action", U.S. Appl. No. 15/220,834, Apr. 26, 2019, 21 pages.
"Final Office Action", U.S. Appl. No. 16/589,896, Aug. 18, 2021, 26 pages.
"Final Office Action", U.S. Appl. No. 15/220,834, May 22, 2018, 37 pages.
"Final Office Action", U.S. Appl. No. 17/019,881, Sep. 1, 2021, 47 pages.
"First Action Interview Office Action", U.S. Appl. No. 15/220,834, Jan. 23, 2018, 4 pages.
"First Action Interview Office Action", U.S. Appl. No. 16/589,896, Nov. 10, 2020, 4 pages.
"First Action Interview Office Action", U.S. Appl. No. 17/019,881, Jun. 4, 2021, 5 pages.
"First Action Interview Pre-Interview Communication", U.S. Appl. No. 15/220,834, Dec. 5, 2017, 4 pages.
"Fragment Shader—Wikipedia", Retrieved at: https://www.opengl.org/wiki/Fragment_Shader—on May 20, 2016, 6 pages.
"Geometry Shader—Wikipedia", Retrieved at: https://www.opengl.org/wiki/Geometry_Shader—on May 20, 2016, 6 pages.
"Geometry shaders", Open GL [retrieved Feb. 21, 2022]. Retrieved from the Internet <https://open.gl/geometry>., 12 Pages.
"Metal: Accelerating graphics and much more", Apple Inc., Apple Developer Website [retrieved Apr. 15, 2022]. Retrieved from the Internet <https://developer.apple.com/metal/>., 3 pages.
"Non-Final Office Action", U.S. Appl. No. 15/220,834, Jan. 10, 2019, 21 pages.
"Non-Final Office Action", U.S. Appl. No. 16/589,896, Apr. 14, 2021, 28 pages.
"Non-Final Office Action", U.S. Appl. No. 17/019,881, Dec. 23, 2021, 44 pages.
"Notice of Allowance", U.S. Appl. No. 17/019,881, Apr. 13, 2022, 10 pages.
"Notice of Allowance", U.S. Appl. No. 15/220,834, Jul. 15, 2019, 5 pages.
"Notice of Allowance", U.S. Appl. No. 16/589,896, Feb. 17, 2022, 8 pages.
"NV Path Rendering", NVIDIA GameWorks—Retrieved at: https://developer.nvidia.com/nv-path-rendering—on May 20, 2016, 2 pages.
"OpenGL: The Industry Standard for High Performance Graphics", The Khronos® Group Inc. [online][retrieved Apr. 15, 2022]. Retrieved from the Internet <https://www.opengl.org/>., 3 pages.
"Pre-Interview First Office Action", U.S. Appl. No. 16/589,896, filed Sep. 22, 2020, 4 pages.
"Pre-Interview First Office Action", U.S. Appl. No. 17/019,881, filed Apr. 14, 2021, 5 pages.
"Tessellation—Wikipedia", Retrieved at: https://www.opengl.org/wiki/Tessellation—on May 20, 2016, 6 pages.
"Uniform (GLSL)—Wikipedia", Retrieved at: https://www.opengl.org/wiki/Uniform_%28GLSL%29—on May 20, 2016, 4 pages.
"Vatti clipping algorithm—Wikipedia", Retrieved at: https://en.wikipedia.org/wiki/Vatti_clipping_algorithm—on May 20, 2016, 2 pages.
"Vertex Shader—Wikipedia", Retrieved at: https://www.opengl.org/wiki/Vertex_Shader—on May 20, 2016, 4 pages.
Chan, Eric , "Fast Antialiasing Using Prefiltered Lines on Graphics Hardware", Retrieved at: http://people.csail.mit.edu/ericchan/articles/prefilter/, Feb. 28, 2004, 7 pages.
Elber, Gershon , "Comparing Offset Curve Approximation Methods", IEEE Computer Graphics and Applications archive vol. 17 Issue 3, May 1997, pp. 62-71.
Loop, Charles et al., "Resolution Independent Curve Rendering Using Programmable Graphics Hardware", In Journal of ACM Transactions on Graphics, vol. 24, Issue 3, Jul. 2005, 10 pages.
Nehab, Diego et al., "Random-Access Rendering of General Vector Graphics", ACM Transactions on Graphics vol. 27, No. 5 [retrieved Feb. 21, 2022]. Retrieved from the Internet <https://hhoppe.com/ravg.pdf>., Dec. 1, 2008, 10 Pages.
2303534.8 , "Combined Search and Examination Report", GB Application No. 2303534.8, Oct. 3, 2023, 7 pages.
2303534.8 , "IPO Search and Examination Report", GB Application 2303534.8, Jun. 26, 2024, 5 pages.

* cited by examiner

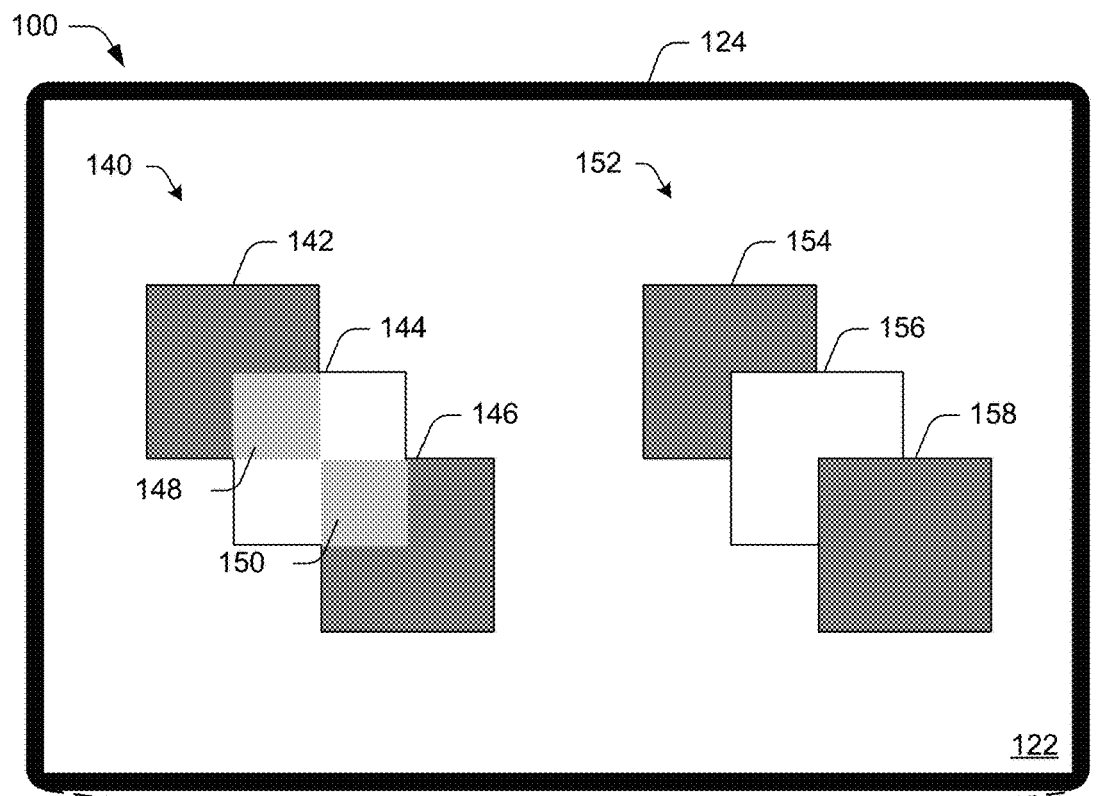
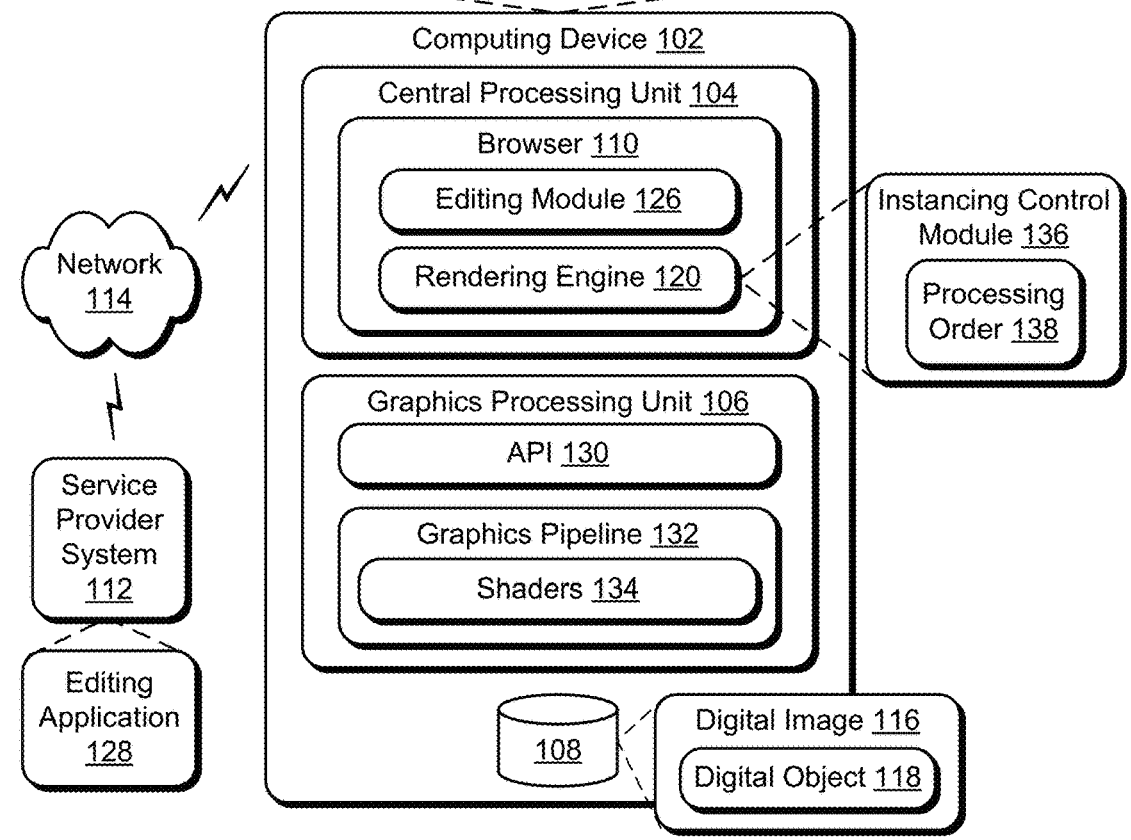
Fig. 1

```
/* Transform A, B, C to pixel space*/
    Ap = A * M, Bp = B * M, Cp = C * M
/*Compute 4 vertices P, Q, R, S of expanded quad shown in Fig12.3 */
    [P, Q, R, S] = Expand (Ap, Bp, Cp, D)
/*Compute inverse of Transform matrix M.*/
    M' = Inverse(M)
/* Transform P,Q, R, S to coordinate space of input vertices A, B, C*/
    P1 = P * M', Q1 = Q * M', R1 = R * M', S1 = S * M'
/*Select out vertex based on gl_VertexId*/
    o   Possible Out Vertices: Quad = [P1, Q1, R1, S1]
    o   Out vertex position: gl_position = Quad [gl_vertexID%3 + gl_vertexId/3]
/*Explicitly Handle interior triangles */
    o   Possible Out vertices: Quad = [A, B, C, A]
    o   Out vertex position:
          • If(gl_vertexID <3)
              gl_position = Quad [gl_vertexID%3 + gl_vertexId/3]
          else
              gl_position = [-1, -1, 0, 0] /*discard triangle by setting position outside view port */
```

Fig. 17

GRAPHICS PROCESSING UNIT INSTANCING CONTROL

BACKGROUND

Digital images rendered by computing devices include a variety of types of digital objects, examples of which include raster objects and vector objects. Raster objects are defined as a matrix (i.e., grid) of pixels having respective color values. Because raster objects are pixel based, however, raster objects are resolution dependent. As such, changes in a zoom level causes corresponding changes to a size of the pixels used to form the raster object, which causes visual artifacts in practice such as blurriness and a pixelated appearance. Further, storage of raster objects consumes significant amounts of memory resources of the computing devices in order to define each of the pixels and store color values for those pixels.

To address this, vector objects have been developed that are defined mathematically, which permits scaling of the vector objects to different resolutions without a loss in quality or developing visual artifacts. Functionality made available by conventional graphics processing units to improve efficiency in rendering digital images, however, are not available in some instances for vector objects. Some functionality, for instance, is performed in a pixel space and therefore is not available in a vector space. Conventional techniques used to overcome this challenge are therefore employed at the central processing unit and not the graphics processing unit, thereby negating performance benefits otherwise available through use of a graphics processing unit.

SUMMARY

Graphics processing unit instancing control techniques are described that overcome conventional challenges to expand functionality made available via a graphics processing unit. In one example, these techniques support ordering of primitives within respective instances of a single draw call made to a graphics processing unit. This is performed by ordering primitives within respective instances that correspond to polygons for rendering. The ordering of the primitives overcomes limitations of conventional techniques and reduces visual artifacts through support of correct overlaps and z-ordering.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

FIG. 1 depicts a digital medium environment configured to perform graphics processing unit instancing control.

FIG. 17 depicts an example implementation of computing position coordinates for each vertex as part of geometry expansion as shown in FIG. 16.

Figure 2:
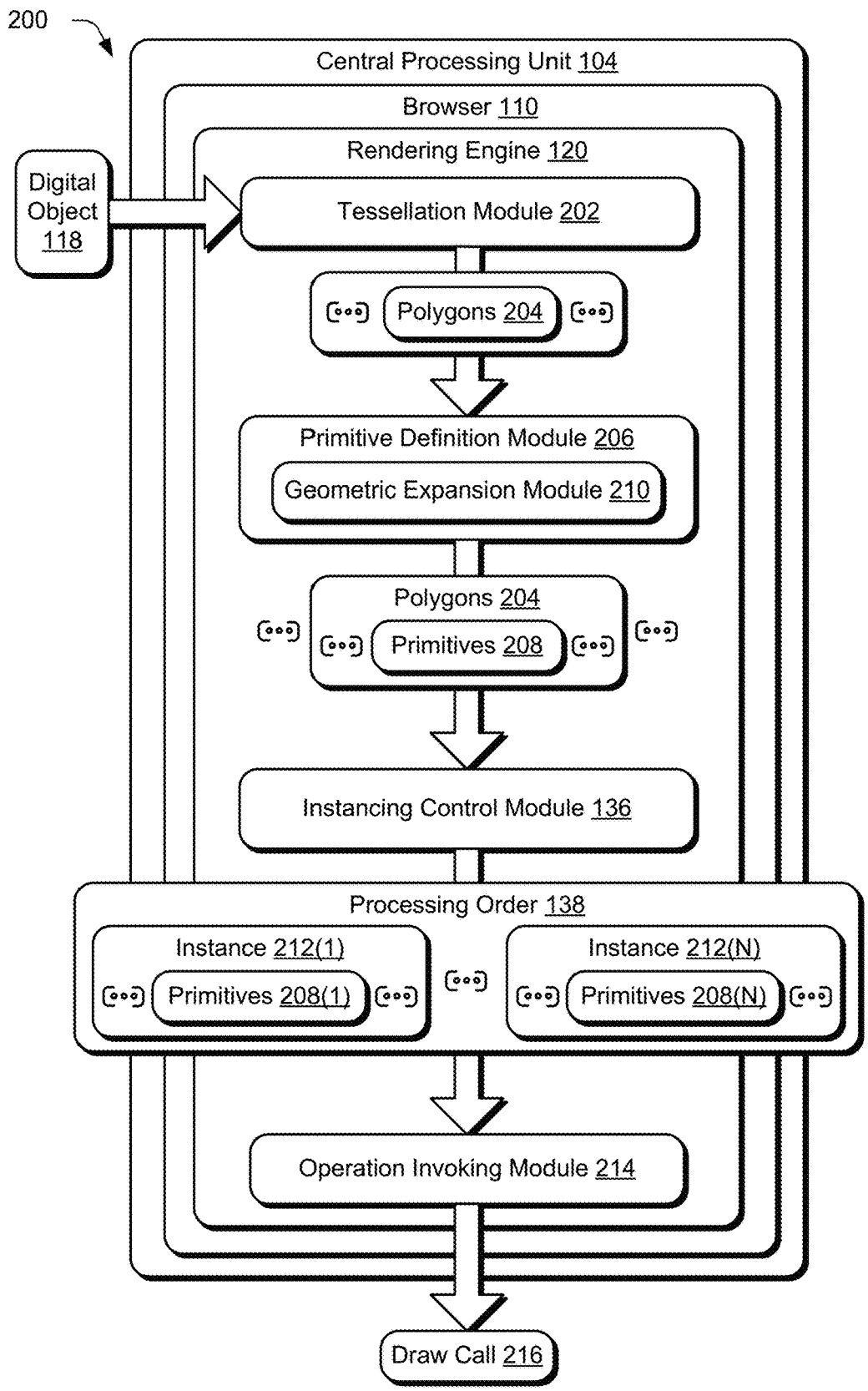
FIG. 2 depicts a system in an example showing operation of a rendering engine of a browser of FIG. 1 in greater detail.

The detailed description is described with reference to the accompanying figures. Entities represented in the figures are indicative of one or more entities and thus reference is made interchangeably to single or plural forms of the entities in the discussion.

DETAILED DESCRIPTION

Overview

Graphics processing units are configured to expand the functionality made available by a computing device, e.g., for use in creating and rendering digital content, artificial intelligence and machine learning, and so forth. Graphics processing units are typically utilized in combination with a central processing unit as part of parallel processing to expand functionality and speed of features made available by the computing device. The central processing unit, for instance, is configured to support general processing functions of the computing device. A graphics processing unit, on the other hand, supports targeted functionality for specific tasks that are accelerated based on a hardware design of the graphics processing unit. The targeted functionality of the graphics processing unit, however, is not available in some instances thereby reducing operational efficiency of the computing device.

Consider an example in which a browser is executed by a central processing unit. Browsers are implemented as a set of operations specified in software executed by a processing device to access the World Wide Web. A browser, for instance, is executable by a client device to access a service provider system to access digital services made available via a network. As the World Wide Web has expanded, so too has the functionality and complexity of digital content made available via the digital services.

In a scenario in which the digital services involve digital content creation and editing, for instance, complexity of digital objects included in digital content has a direct effect on an ability of the computing device to render the digital content. An example of this involves rendering of vector objects, also known as vector graphics. Conventional techniques used to render vector objects, however, are limited by the functionality made available to browsers and therefore involve use of the central processing unit to address these deficiencies, which is computationally ineffective and hinders operation of the computing device.

In an antialiasing technique for the vector objects, for instance, antialiasing spread is calculated at a border of the vector object to reduce visual artifacts and provide a "smooth" appearance. However, conventional techniques used to generate the antialiasing spread are performed at the central processing unit for each resolution. This negates any potential performance benefits that are otherwise available by the graphics processing unit caused by rendering of the vector object to "zoom in" or "zoom out" a view of the digital object.

Accordingly, techniques are described that improve and expand operation of a computing device. In one example, these techniques are configured to generate resolution dependent antialiasing spread as part of rendering a vector object using a graphics processing unit, which is not possible using conventional techniques. These techniques achieve full resolution independent render by generating the antialiasing spread on the fly and in real time on the graphics processing unit. Further, these techniques are usable to expand functionality made available to browsers (i.e., web surfaces) to enable the browser to perform advanced digital content editing, which is not possible using conventional techniques.

This is performed by ordering primitives within respective instances in a draw call made to the graphics processing unit in a manner that reduces communication between a central processing unit and the graphics processing unit and enables the graphics processing unit to react to changes in resolution as part of rendering a vector object at the graphics processing unit, itself. Although in examples described in the following discussion these techniques are described as employed using a browser, processing efficiency and functionality made available by these techniques is also applicable to other examples of rendering digital content.

In one example, a digital image is received by a browser, which is to be rendered for display by a display device using a rendering engine. The digital image includes a polygon configured as a vector object. Because a graphics processing unit is limited to an understanding of primitives (also referred to as geometric primitives such as lines, triangles, and points) the vector object is converted by the rendering engine to a form that is understood by the graphics processing unit. In this example, this is performed by tessellating the vector object to form polygons, e.g., triangles. The polygons are then used as a basis to form an antialiasing spread, e.g., through geometry amplification in which at least two primitives are formed for each of the polygons that are to be subject of antialiasing.

"Instancing" is a rendering technique for rendering multiple copies of a geometry. In an example in which a digital image includes multiple digital objects configured as a blade of grass, a single mesh defining the blade of grass is used to render multiple copies, which changes made through use of a transformation matrix applied to the single mesh to provide variations. As a result, instancing is usable to support a single communication from a central processing unit to invoke a graphics pipeline of the graphics processing unit to produce these multiple copies. In conventional instancing techniques, however, draw calls are made to render one instance of "N" triangles. Because conventional processing ordering of instances are defined using instance IDs this causes a first instance for each shape to be rendered, followed by a second instance for each shape (e.g., a transformed copy of the first), and so on. This causes errors at overlapping regions and incorrect z-ordering in practice.

In the techniques described herein, however, the rendering engine of the browser is configured to order primitives within respective instances to overcome these conventional errors. Therefore, instead of rendering one instance of "N" triangles, the draw call is ordered to render "N" instances of each triangle in order. In other words, the instances are formed such that primitives corresponding to a respective input polygon are included together within a single respective instance. This causes the primitives (e.g., representing the vector object and corresponding antialiasing spread) for a particular polygon to be rendered together in sequence, thereby preserve a z ordering with correct overlaps. These techniques are usable to support a variety of functionality, including vector object rendering using a browser through on the fly processing on a graphics processing unit, which is not possible using conventional techniques. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone as illustrated), and so forth. Thus, the computing device 102 ranges from full resource devices with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers utilized by a business to perform operations "over the cloud" as described in FIG. 19 and usable to implement the service provider system 112.

The computing device 102 includes a central processing unit 104, a graphics processing unit 106, and an example of memory illustrated as a storage device 108. The central processing unit 104 is configured to execute general-purpose instructions to perform operations. The central processing unit 104, for instance, includes an arithmetic-logic unit (ALU) to perform logic operations, registers that supply operations to the arithmetic-logic unit and receive a result of these operations, and a control unit to manage obtaining, decoding, and execution of the instructions.

The graphics processing unit 106, on the other hand, is implemented using specialize hardware targeted to achieve increased efficiency through use of a parallelized structure. This enables the graphics processing unit 106 to achieve increased efficiency by processing blocks of data in parallel, e.g., for image rendering, machine learning, artificial intelligence, and so on. The graphics processing unit 106 is communicatively coupled to the central processing unit 104, e.g., via a bus.

The browser 110 (e.g., web browser, web surface) in this example is illustrated as executed on the central processing unit 104. The browser 110 is configured to support access to a service provider system 112 via a network 114, i.e., the Internet or World Wide Web using uniform resource locators (URLs). The browser 110, for instance, is configured to obtain data (e.g., a digital image 116 having a digital object 118) from digital services executed by the service provider system 112. The data is then rendered by a rendering engine 120 for display in a user interface 122 by a display device 124.

An example of this is illustrated through execution of an editing module 126 at the central processing unit 104 in communication with an editing application 128 implemented at a digital service of the service provider system 112. The editing module 126, for instance, includes locally executable instructions described in data received from the editing application 128 via the network 114. The editing module 126 is configured to edit a digital image 116, e.g., a digital object 118 configured as a raster object, vector object, and so on. This is performable using operations to edit pixels, mathematical representations, use of filters, and so forth.

The rendering engine 120 of the browser 110 is configured to call an application programming interface 130 of a graphics pipeline 132. This causes execution of shaders 134 at the graphics processing unit 106 to perform the rendering, e.g., to a frame buffer. Shaders 134 are collections of instructions that are compiled at a rendering engine 120 at the central processing unit 104 and then sent to the graphics processing unit 106 for execution. In one example, the rendering engine 120 implements a library executed on the central processing unit 104 to compile instructions that are then sent to the graphics processing unit 106, e.g., using a shading language.

As previously described, conventional browser implementations do not support functionality that is available to other software implementations. An example of this is geometry shaders in antialiasing scenarios that are executable to generate antialiasing spread. Because of this, conventional browser implementations rely on processing by the central processing unit, which negates any potential efficiencies available from inclusion of a graphics processing unit on a computing device.

According, the rendering engine 120 includes an instancing control module 136 that is configured to generate a processing order 138 to overcome challenges of conventional techniques. In this way, functionality of the graphics processing unit 106 is made available to the browser 110, which is not possible in conventional techniques. Further, the instancing control module 136 overcomes challenges of conventional techniques that result in visual artifacts.

Instancing is a technique to render primitives in batches. However, conventional techniques used for instancing result in rendering issues. In a first conventional example 140, first, second, and third rectangles 142, 144, 146 involve rendering a corresponding instance of a single triangle, twice, for each of the rectangles using a single draw call. This causes first and second overlaps 148, 150 as visual artifacts. This is because conventional rendering techniques render the triangles based on instance IDs, and thus a first instance for each of the shapes is rendered first, followed by a second instance, and so on.

Through use of the instancing control module 136 in the techniques described herein, on the other hand, a processing order 138 is generated to correctly render the instances without visual artifacts. An example 152 of this is illustrated as first, second, and third rectangles 154, 156, 158 rendered in a correct z order. In this way, operation of the central processing unit 104, graphics processing unit 106, browser 110, and computing device 102 as a whole is improved. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Graphics Processing Unit Instancing Control

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-19 in parallel with a procedure 400 of FIG. 4 describing an example of a graphics processing unit instancing control technique.

FIG. 2 depicts a system 200 in an example showing operation of a rendering engine of a browser 110 of FIG. 1 in greater detail. To begin, a digital object 118 is received by a browser 110 (block 402). In this example, the digital object 118 is configured as a vector object. As described above, the graphics processing unit 106 is compatible with a defined set of fundamental primitives, e.g., lines, triangles, and points. Therefore, in order to render the vector object in this example, a tessellation module 202 is configured to form polygons 204 (e.g., triangles) by tessellating the vector object (block 404).

In one example, the vector object is tessellated into triangles at a fixed resolution and these triangles are rendered at different resolutions corresponding to different zoom levels using a transformation matrix by a graphics processing unit 106. However, in conventional implementations other image functionality involving further processing of these triangles is not available to a rendering engine 120 of the browser 110. An example of this include antialiasing, which is conventionally performed in a pixel space to generate an antialiasing spread that is used to "smooth" transitions between the triangles. Conventional techniques generate the antialiasing spread at each resolution, which reduces and even removes performance benefits available via a graphics processing unit.

Figure 5:
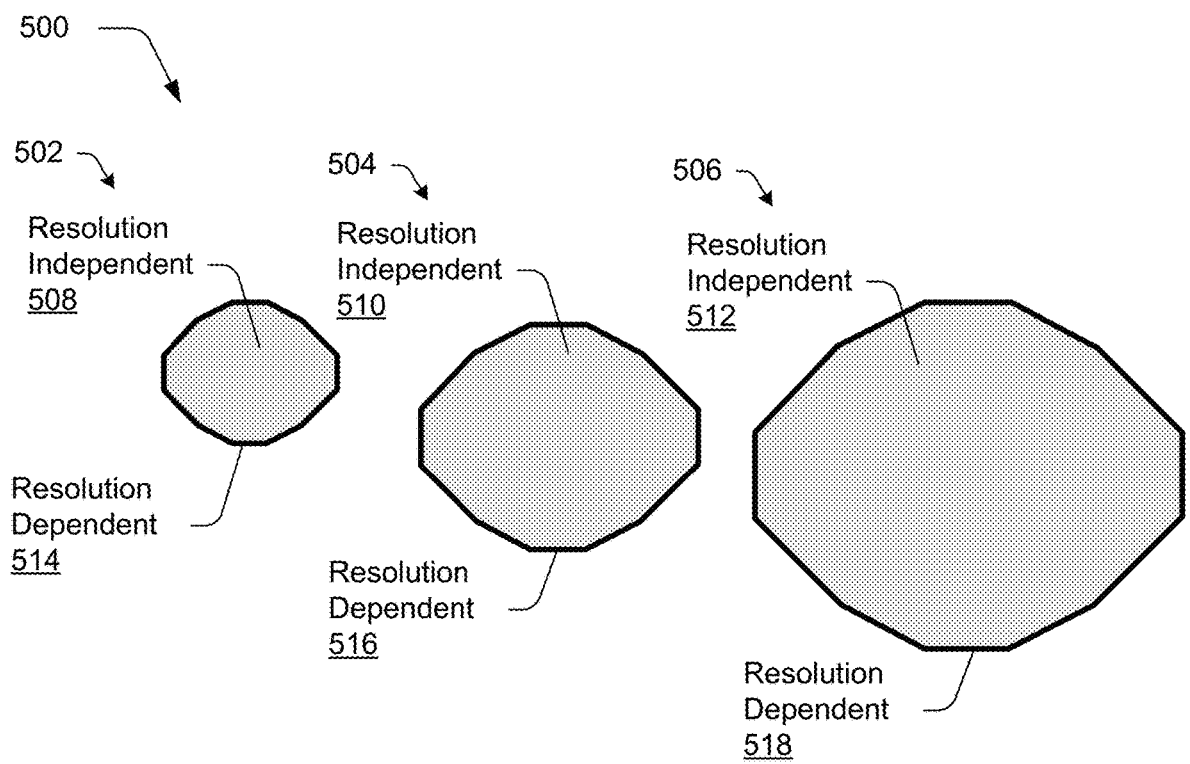
FIG. 5 depicts an example implementation showing effects of rendering resolution dependent and independent regions of a geometry of a vector object.

FIG. 5 depicts an example implementation 500 showing effects of rendering resolution dependent and independent regions of a geometry of a vector object. A same vector object is illustrated at first, second, and third zoom levels 502, 504, 506. For each of the zoom levels, the vector object includes resolution independent path geometries 508, 510, 512 that are configured to scale automatically based on zoom level. Resolution dependent geometries 514, 516, 518 are also defined at a border (e.g., boundary) of the objects that include an antialiasing spread. As depicted, the resolution dependent geometries 514, 516, 518 involve thin fills that exhibit visual artifacts viewable as an irregular border.

Figure 6:
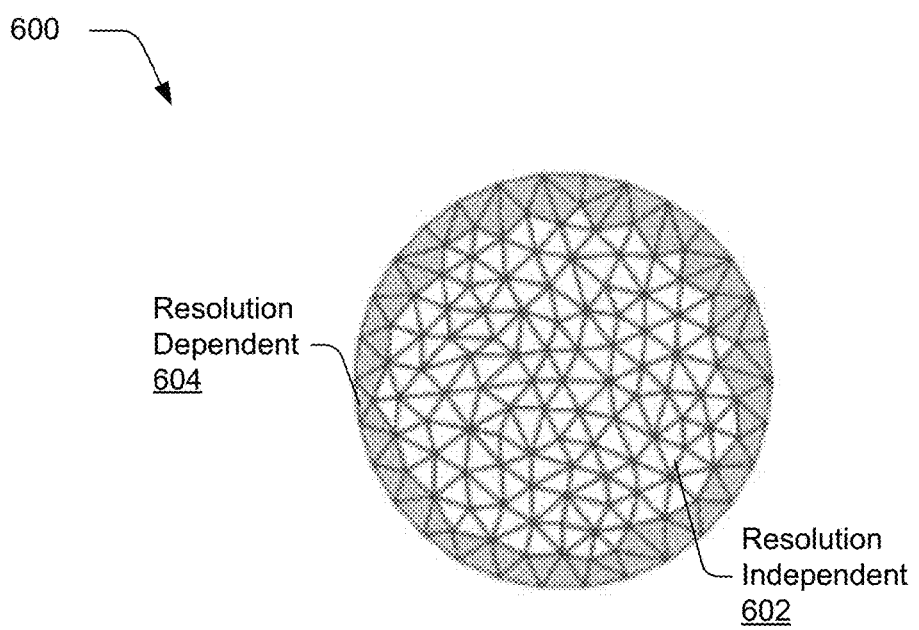
FIG. 6 depicts an example implementation of a tessellated output of a simple ellipse.

FIG. 6 depicts an example implementation 600 of a tessellated output of a simple ellipse. The ellipse includes a resolution independent 602 tessellated output of interior triangles in white and a resolution dependent 604 tessellated output of control triangles in gray. Path objects of the ellipse, for instance, bounded by cubic Bezier curves are tessellated into a set of triangles by the tessellation module 202 on the central processing unit 104. Cubic Bezier curves are split into monotonic quadratic Bezier segments. The control triangles are generated for each quadratic Bezier curve and an interior of the geometry is triangulated into interior triangles, e.g., using a Vatti algorithm.

Thus, the control triangles in this example are subject to computation of the antialiasing spread whereas the interior triangles are not. Accordingly, in an implementation the rendering engine 120 is configured to detect whether the polygons 204 formed from tessellating the digital object 118 are interior triangles or control triangles of the digital object 118. Antialiasing techniques are then implemented for the control triangles, and not the interior triangles as further described below.

Figure 7:
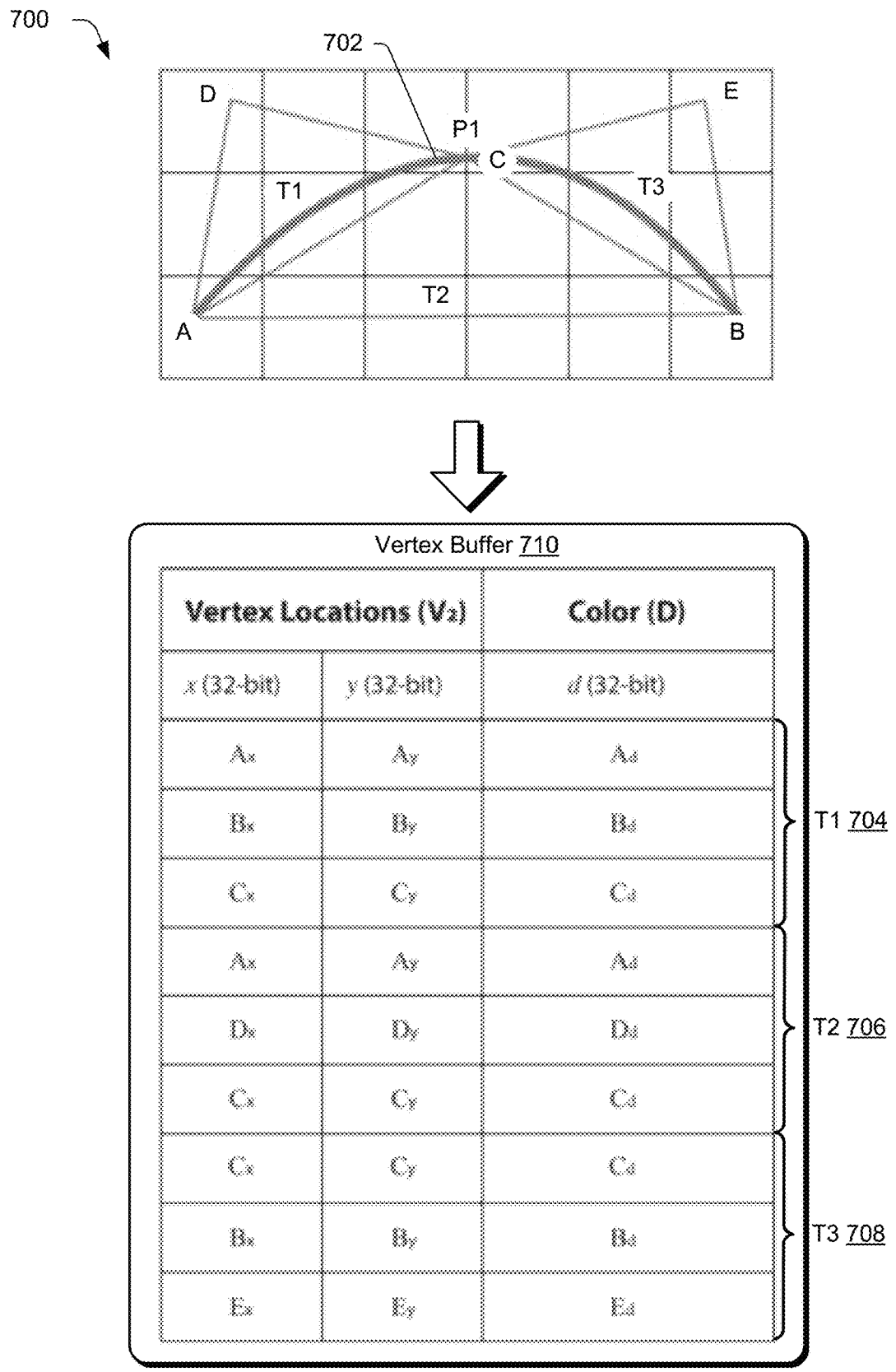
FIG. 7 depicts an example implementation of data organization and transfer to graphics processing unit memory resulting from the tessellation of a digital object.

FIG. 7 depicts an example implementation 700 of data organization and transfer to a graphics processing unit 106 memory an output resulting from the tessellation of the digital object. A curve 702 "P1" is tessellated into first, second, and third triangles 704, 706, 708 having vertices of "ABC," "ADC" and "CBE" in the illustrated example to a vertex buffer 710 by the tessellation module 202. The vertex buffer 710 is accessible to the graphics processing unit 106, and more particularly to shaders 134 of the graphics processing unit 106.

Output data from the tessellation (e.g., the polygons 204) is organized in the vertex buffer 710 and contains the following information for each vertex:

Coordinate positions (x,y);
Color (d); and
Antialiasing attributes (u,v).

The antialiasing attributes are added per vertex in the vertex buffer 710, with a value "u" denoting a type of primitive and antialiasing side. Examples of values of "u" include:

Interior triangle;
Exterior triangle with convex side antialiasing;
Exterior triangle with concave side antialiasing;
Line with anticlockwise side antialiasing; and
Line with clockwise side antialiasing.

The value "v" represents a stroke wide of the path object in an instance in which the path object is a stroke.

Figure 8:
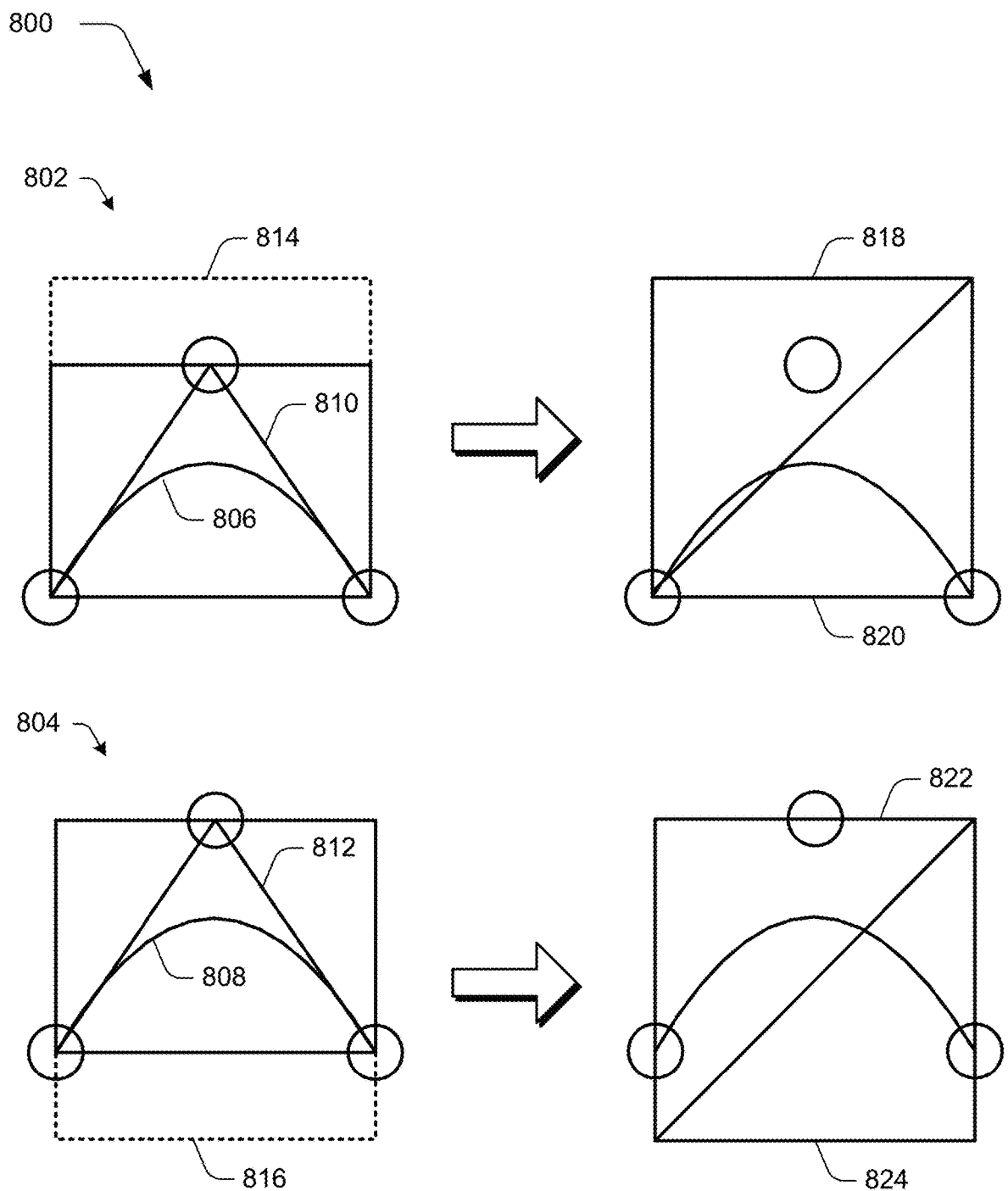
FIG. 8 depicts an example implementation of geometry amplification for use in generating an antialiasing spread.

FIG. 8 depicts an example implementation 800 of geometry amplification for use in generating an antialiasing spread. In the first and second illustrated examples 802, 804, a primitive definition module 206 is used to expand polygons 204 to define a plurality of primitives for each of the polygons (block 406) as the antialiasing spread. The first example 802 depicts convex side antialiasing and the second example 804 depicts concave side antialiasing.

Continuing the previous discussion of control and interior triangles, for each control triangle in the vertex buffer 710 (i.e., polygon that is detected as a control triangle and thus not an interior triangle), the primitive definition module 206 employs a geometric expansion module 210 to generate at least two primitives, e.g., triangles. The left side of the figure depicts first and second input curves 806, 808 and respective vertices and polygons 204 (e.g., first and second triangles 810, 812) that are an input to the geometric expansion module 210. First and second extensions 814, 816 generated by the geometric expansion module 210 to achieve antialiasing are depicted using respective dashed lines, which is performed in an opposite direction for the convex and concave curves, respectively.

The right side of the figure depicts primitives 208 formed by the geometric expansion module 210, which include first and second primitives 818, 820 based on the first triangle 810 and first and second primitives 822, 824 based on the second triangle 812. In this way, the geometric expansion module 210 is configured to define the plurality of primitives to include an antialiasing spread for control triangles of the vector object.

Returning again to FIG. 2, the primitives 208 based on and corresponding to respective polygons 204 are received as an input by the instancing control module 136 as organized in a vertex buffer 710. In this example, rather than maintain additional primitives as placeholder geometry for antialiasing, a mechanism is described to invoke the graphics pipeline 132 for multiple primitives, e.g., via a single draw call. The rendering engine 120 employs an operation invoking module 214 to invoke a single draw call 216 using the plurality of instances arranged according to the processing order 138 (block 412), i.e., to "make the single draw call.

Figure 9:
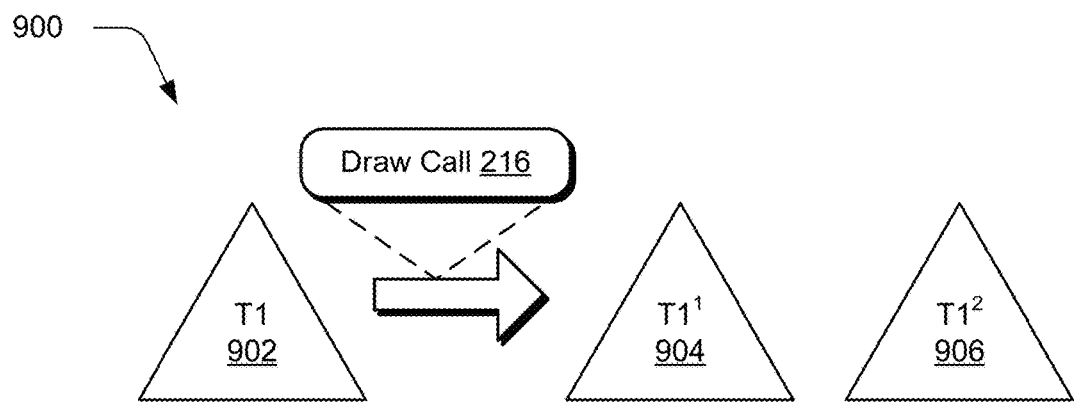
FIG. 9 depicts an example implementation in which a single draw call is used to invoke two instances from a sample triangle from a tessellation output on a central processing unit.

FIG. 9 depicts an example implementation 900 in which a single draw call 216 is used to invoke two instances from a sample triangle from tessellation output on a central processing unit 104. A first triangle 902 "T1$^1$" for instance, is subject to an instancing operation to generate a first instance 904 "T1$^1$" and a second instance 906 "T1$^2$." In an example in which the first triangle 902 "T1$^1$" is a control triangle, the first and second instances 904, 906 "T1$^1$" and "T1$^1$" are transformed to generate the expanded rectangular region of the expanded geometry as shown in FIG. 7.

This expanded region includes a region for a control triangle geometry as well as antialiasing spread formed for Bezier curves and line segment as part of an antialiasing operation. For interior triangles, an antialiasing spread is not calculated in this example. Instead, vertex positions of one of the instances in a first shader are transformed such that the transformed vertex positions fall outside a view area (i.e., view port dimensions) and are culled before rasterization in the graphics pipeline 132, e.g., by a vertex shader 302. However, in conventional techniques this practice fails when attempting to render multiple polygons 204 (e.g., formed from a respective digital object 118) in batches, i.e., more than a single object in a single draw call for vector objects.

Figure 10:
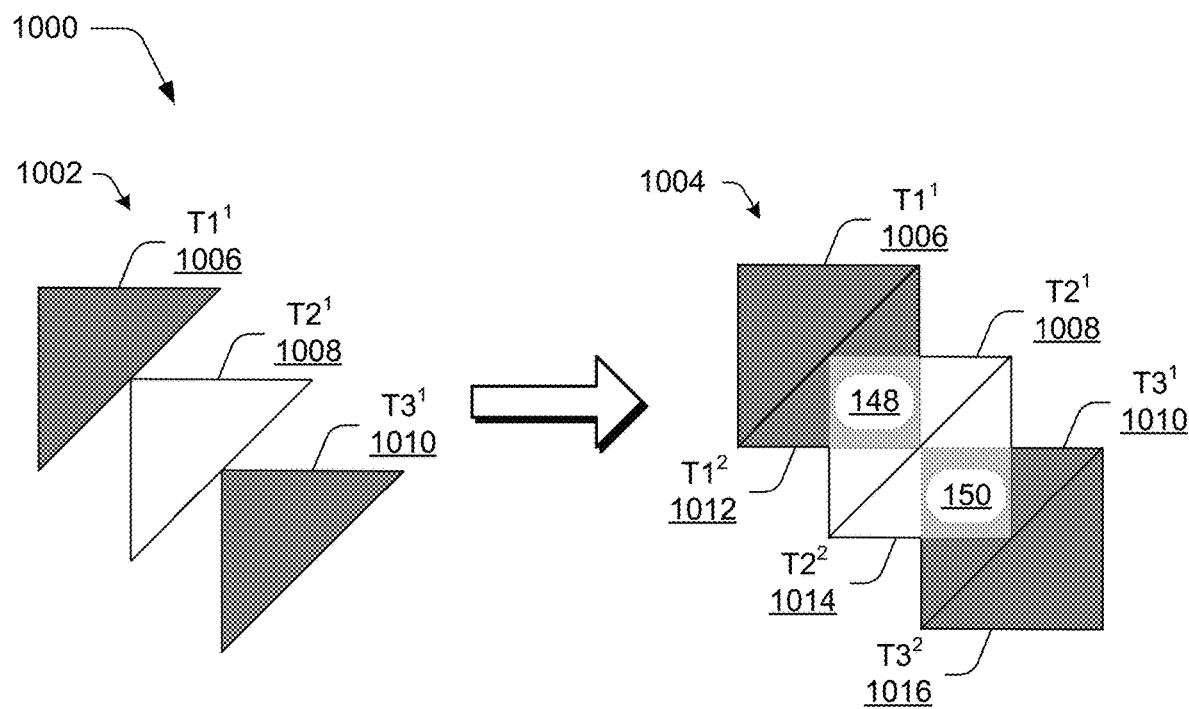
FIG. 10 depicts a prior art example of batch rendering using conventional instancing techniques for rendering additional triangles using first and second instances.

FIG. 10 depicts a prior art example 1000 of batch rendering using conventional instancing techniques for rendering additional triangles using first and second instances 1002, 1004. The illustrated example is employed to draw first, second, and third triangles "P1," "P2," and "P3" that are overlapping and are to be rendered as a batch in a single draw call. A goal of this rendering is depicted in the example 152 of FIG. 1 in which a first rectangle 154 is overlapped by a second rectangle 156 which is overlapped by a third rectangle 158. However, in practice a first conventional example 140 is achieved instead that includes visual artifacts resulting from improper overlaps 148, 150.

This is because conventional rendering techniques process instances in order based on an instance ID. Therefore, the first instance 1002, primitives "T1$^1$," "T2$^1$," and "T3$^1$" 1006, 1008, 1010 are rendered together, e.g., to a frame buffer. After a second drawing instance 1004, rendering of copies of these instances continues, which is illustrated as primitives T1$^2$," "T2$^2$," and "T3$^2$" 1012, 1014, 1016. This causes overlaps 148, 150 as visual artifacts that depart from rendering expectations, thereby making the use of instancing in conventional techniques unavailable due to these inaccuracies.

In the techniques described herein, however, the instancing control module 136 is configured to determine a processing order 138 for a plurality of instances 212(1)-212(N) (block 408). To do so, the instancing control module 136 groups respective primitives 208(1)-208(N) that correspond to respective polygons 204 together in respective instances 212(1)-212(N) (block 410).

Figure 11:
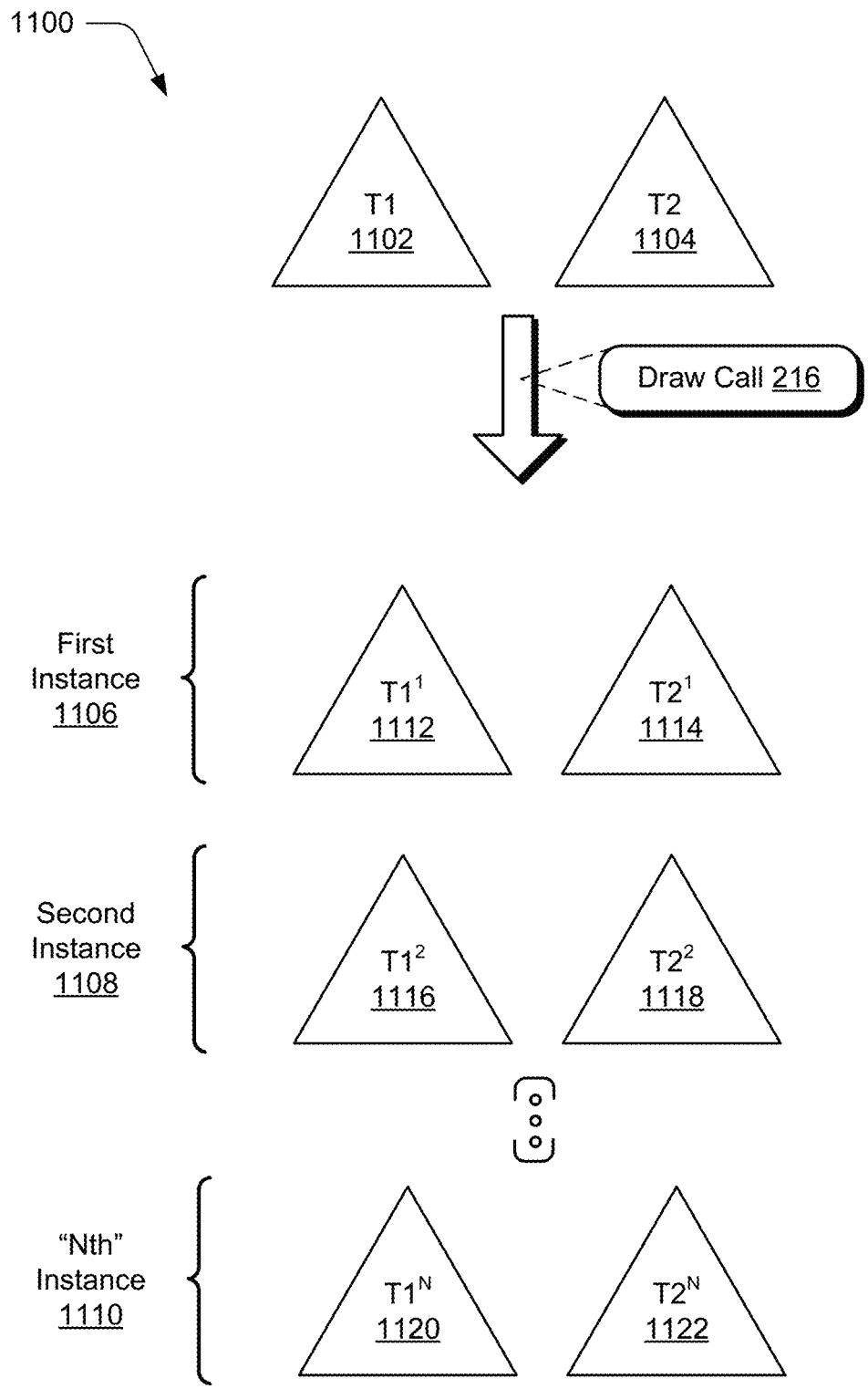
FIG. 11 depicts an example of a determination of a processing order of primitives in respective instances.

FIG. 11 depicts an example 1100 of a determination of a processing order of primitives in respective instances. To do so, the instancing control module 136 configures the processing order 138 in which, instead of rendering "N" instances of a single triangle as performed in convention techniques, "N" instances are rendered of a single triangle. Here, "N" instances represent "N' input triangles, e.g., formed from tessellation of the vector object, in which each triangle represents a virtual shape that does not exist in actuality but rather acts as a medium to define the type of primitive and is used to define the "N" instances" for rendering by the graphics processing unit 106. Tessellation data (e.g., from the vertex buffer 710) of each of the "N" instances is mapped to "N" instances of this virtual shape for generating "N" output shapes.

The virtual shape proves a mechanism to control order of execution of the primitives by the graphics pipeline 132. The number of triangles in this example is defined using a multiplier factor, i.e., a factor by which the number of polygons in the tessellation output by the tessellation module 202 is increased by the primitive definition module 206 to form the primitives 208, e.g., for the control triangles and antialiasing spread as follows:

$$T_v = T_{GPU}/T_{CPU}$$

where "$T_v$" denotes a number of triangles in a virtual shape, "$T_{GPU}$" denotes a number of triangles for rendering by the graphics processing unit 106, and "$T_{CPU}$" denotes a number of triangles in a tessellation output, e.g., polygons 204 and then primitives 208 formed for an antialiasing spread based on the polygons 204.

In FIG. 11, for instance, consider "$T_v=2$" and "$T_{CPU}=N$." Virtual shape triangles "T1" 1102 and "T2" 1104 are subject as a single draw call 216 to render "2N" triangles by the graphics pipeline 132 of the graphics processing unit 106. Here, a total set of triangles "2N" is achieved by generating "N" instances of the two input triangles T1" 1102 and "T2" 1104. The factor of "2" is based on an intended use of instances to generate a second triangle to complete a respective rectangle. Therefore, the pair of triangles represent the virtual shape in this instance.

The instancing control module 136 is then configured to generate the processing order 138 in which primitives 208(1)-208(N) are assigned to respective instances 212(1)-212(N). To do so in FIG. 11, first, second, . . . , and "Nth" instances 1106, 1108, 1010 are formed such that primitives corresponding to respective polygons are rendered together. Therefore, the first instance 1106 includes primitives "T1$^1$" 1112 and "T2$^1$" 1114, the second instance 1108 includes primitives "T1$^2$" 1116 and "T2$^2$" 1118, and the "Nth" instance 1110 includes primitives "T1$^N$" 1120 and "T2$^N$" 1122.

Figure 12:
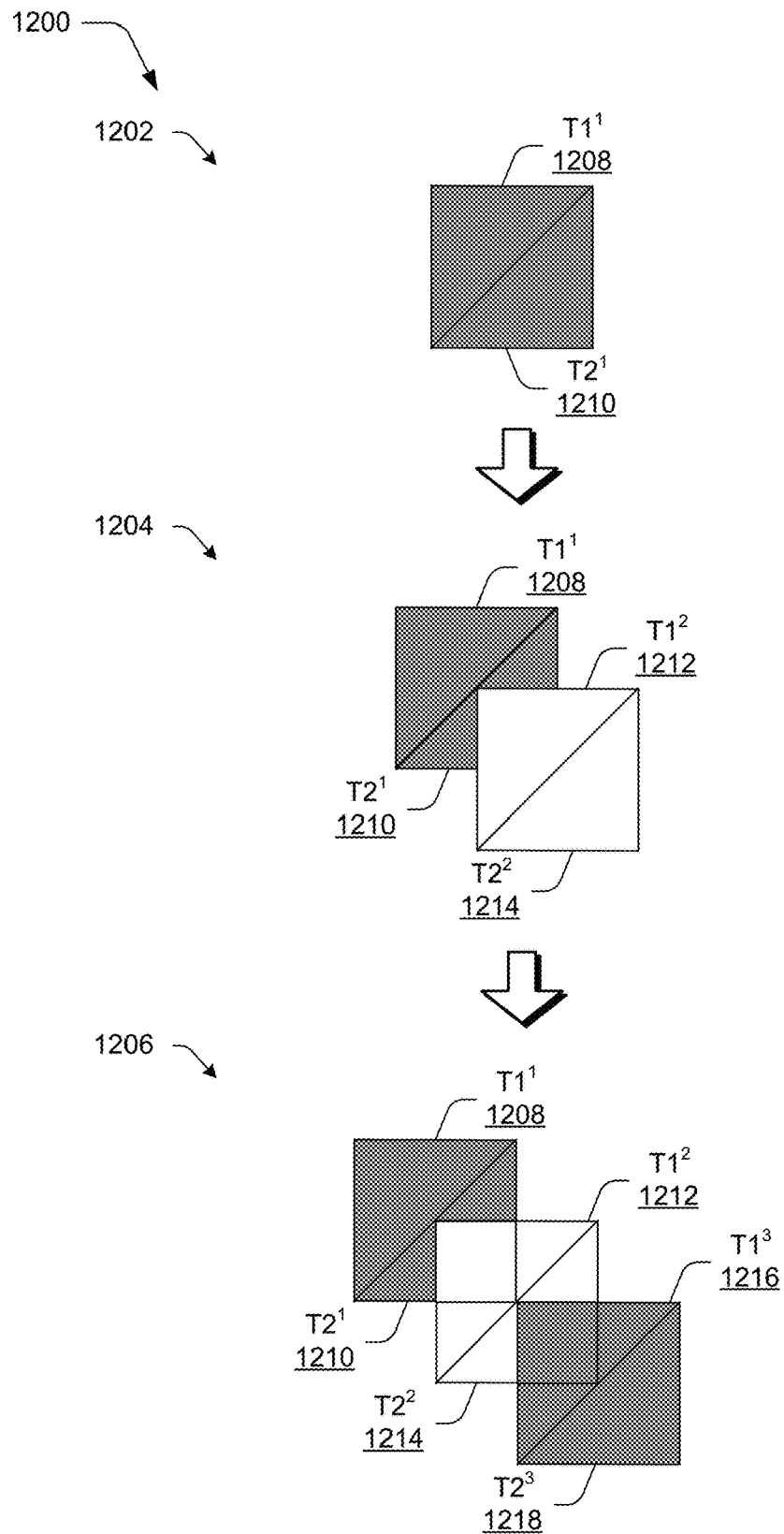
FIG. 12 depicts an example of rendering primitives for respective instance to a frame buffer by a graphics processing unit that follow a processing order defined by an instancing control module.

FIG. 12 depicts an example 1200 of rendering primitives for respective instance to a frame buffer by a graphics processing unit 106 that follow a processing order 138 defined by the instancing control module 136. Like the previous example of FIG. 10, three rectangles "P1," "P2," and "P3" are to be rendered formed by a total number of primitives (e.g., triangles) of "2*N=6." A triangle count on a central processing unit 104 is equal to a number of triangles in a virtual shape of "2(T1, T2)" with an instance count of "N=3." An output of the instancing control module 136 is a primitive count for the graphics processing unit 106 of "2*N=6(T1$^1$, T2$^1$, T1$^2$, T2$^1$, T1$^3$, T1$^3$)."

Figure 13:
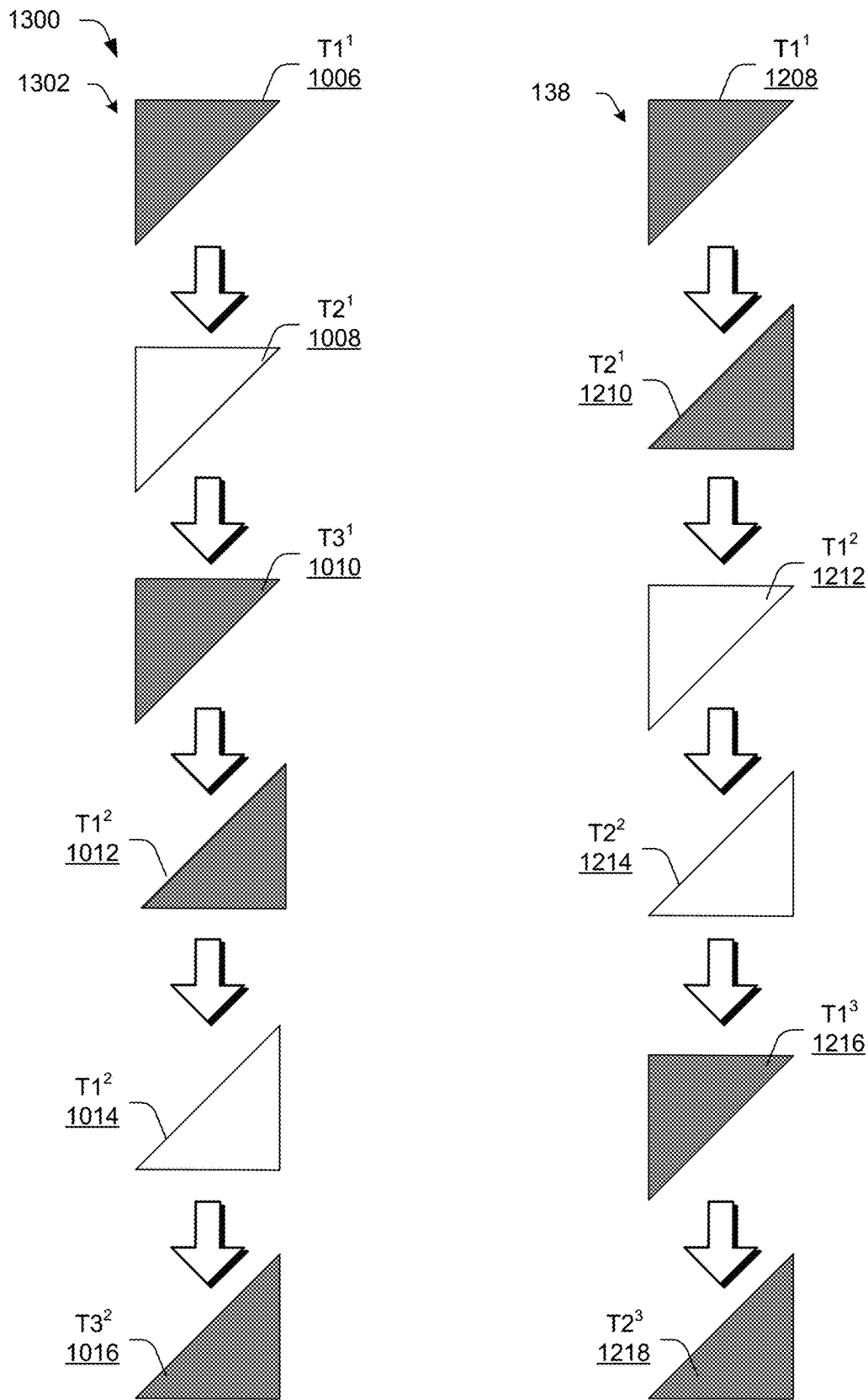
FIG. 13 depicts an example showing a prior art processing order resulting in the visual artifacts following the example of FIG. 10 as contrasted with a processing order calculated by the instancing control module.

At the first instance 1202, primitives "T1$^1$" 1208 and "T2$^1$" 1210 are rendered. At the second instance 1204, primitives "T1$^2$" 1212 and "T2$^2$" 1214 are rendered, after which primitives "T1$^3$" 1216 and "T2$^3$" 1218 are rendered at the third instance 1206. Thus, the first instance 1202 renders primitives for "P1," the second instance 1204 rendered primitives for "P2," and the third instance 1206 renders primitives for "P3." In this way, the visual artifacts are prevented in contrast with the prior art techniques of FIG. 10. FIG. 13 depicts an example 1300 showing a prior art processing order 1302 resulting in the visual artifacts following the example of FIG. 10 as contrasted with a processing order 138 calculated by the instancing control module 136.

Figure 3:
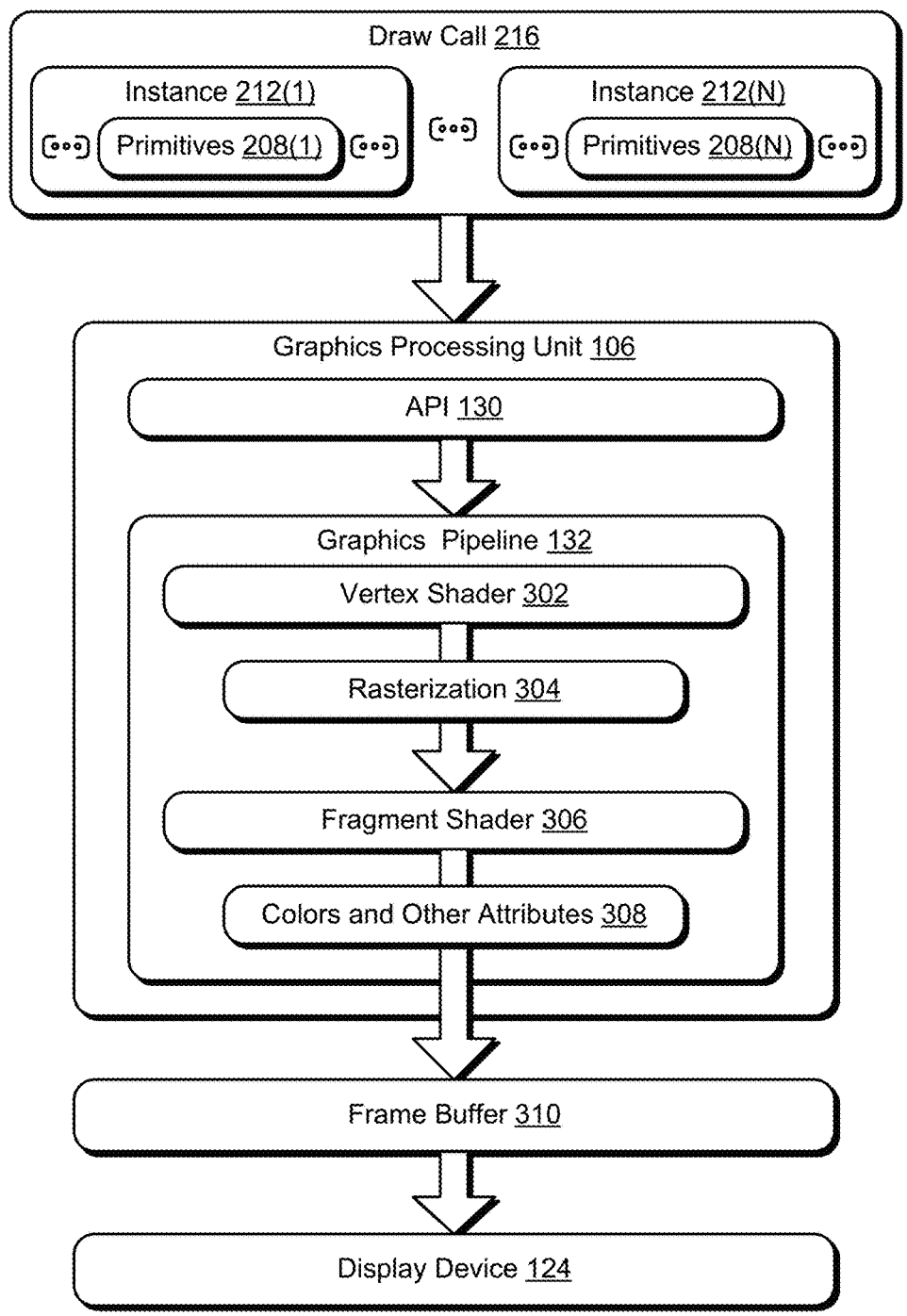
FIG. 3 depicts a system showing operation of a graphics processing unit of FIG. 1 in greater detail.
Figure 4:
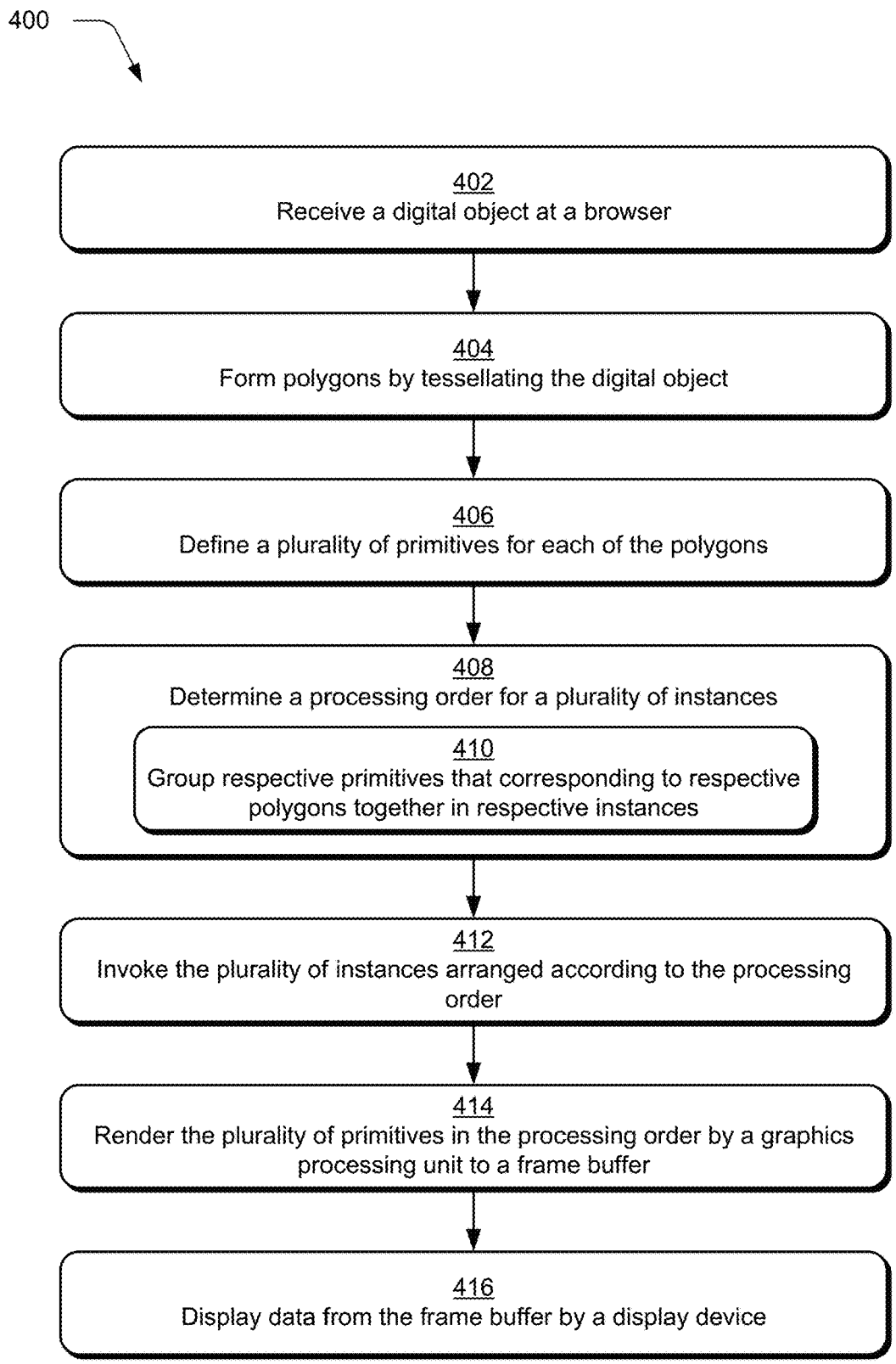
FIG. 4 is a flow diagram depicting a procedure in an example implementation of graphics processing unit instancing control.

FIG. 3 depicts a system 300 showing operation of a graphics processing unit 106 of FIG. 1 in greater detail. The graphics processing unit 106 includes an application programming interface 130 via which the draw call 216 is received. The single draw call 216 invokes the primitives 208(1)-208(N) arranged in corresponding instances 2121(1)-212(N) following the processing order 138 as previously described.

The graphics pipeline 132 is configured to render the plurality of primitives in the processing order 138 to a frame buffer 310 (block 414). To do so, a vertex shader 302 is employed to generate a rasterization 304, after which a fragment shader 306 is leveraged to define color and other attributes 308 to respective pixels. Once completed, the data from the frame buffer 310 is displayed by a display device 124 (block 416).

Thus, the above technique employs a single draw call 216 to render "N" instances of a virtual shape, where "N" is number of triangles in tessellation output of the object to be drawn. This results in "6*N" vertex shader 302 invocations for each draw call. The multiplier of "6" is calculated based on a determination that two triangles (i.e., primitives) are to be rendered for each virtual shape, therefore six vertices. Compared to conventional techniques, the "6*N" vertex shader 302 invocations conserve memory cost of vertex data for these vertices and reduces a geometry shader execution performance cost. The following discussion describes an example of how to program the vertex shader 302 and fragment shader 306 perform antialiasing by rendering an antialiasing spread.

Figure 14:
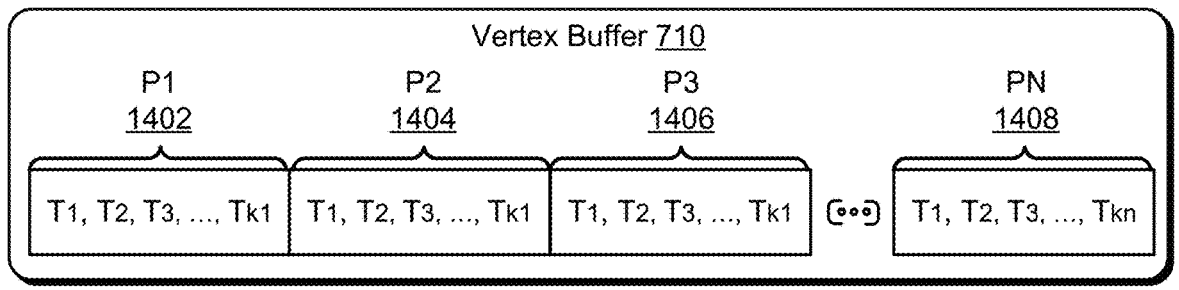
FIG. 14 depicts an example implementation of a vertex buffer layout in array buffers for the vertex buffer.
Figure 15:
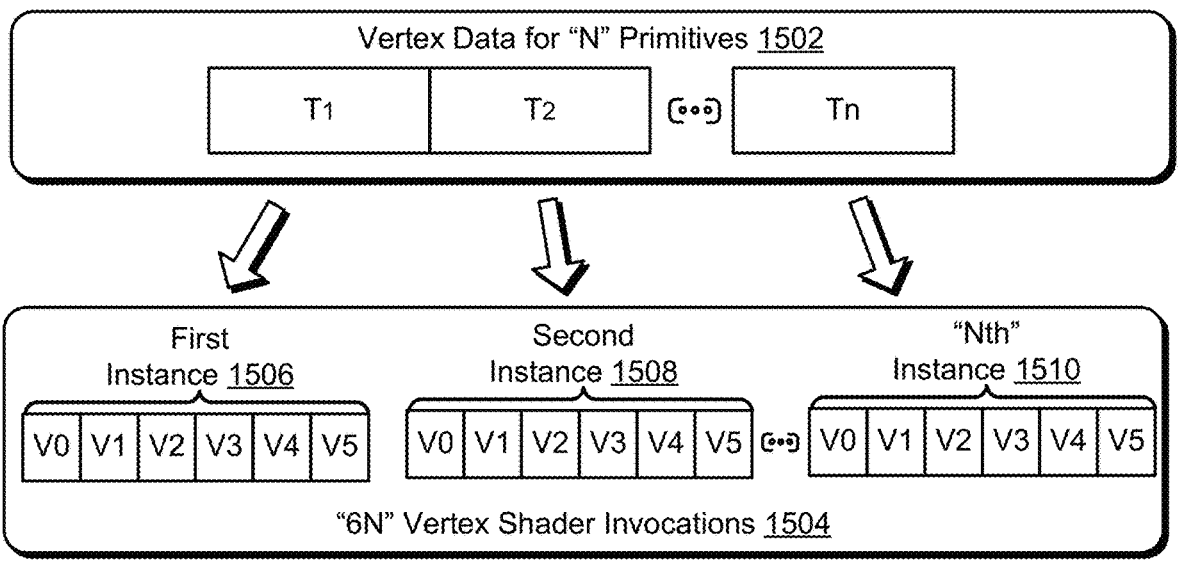
FIG. 15 depicts an example implementation of vertex data to vertex shader invocation mapping.

FIG. 14 depicts an example implementation 1400 of a vertex buffer layout in array buffers for the vertex buffer 710. Vertex data is organized as described in relation to FIG. 7 in a vertex buffer 710 (e.g., linear vertex buffer) and transferred to graphics processing unit 106 memory. For a batch of paths "P1" 1402, "P2" 1404, "P3" 1406 through "PN" 1408 with "Ti" triangles, vertices are arranged in a draw order of the paths in the batch and in the draw order of triangles within the path.

Each vertex shader invocation involves access to three vertices of the triangle, to which, a current vertex belongs. Because the input draw shape (e.g., virtual shape) is separate from data present in the vertex buffer 710, a mapping is established as shown in an example 1500 of FIG. 15 between each vertex of vertex data for "N" primitives 1502 and corresponding "6N" vertex shade invocations 1504 for a first instance 1506, a second instance 1508, through an "Nth" instance 1510.

In an implementation, this technique does not use uniform buffer objects which allows raw access into the buffer to read data. This is because use of uniform buffer objects limit performance. Array buffers are used to store vertex data. Vertex array attributes are then defined in such a manner that for each six vertices, an index to the array attribute is advanced by one triangle data in the vertex buffer 710. Typically, each vertex invocation causes vertex array attribute index to advance by number of bytes in one vertex data. With the techniques described herein, vertex array attribute index is advanced by data of three vertices (one triangle) and that too after every six vertex shader invocations.

Figure 16:
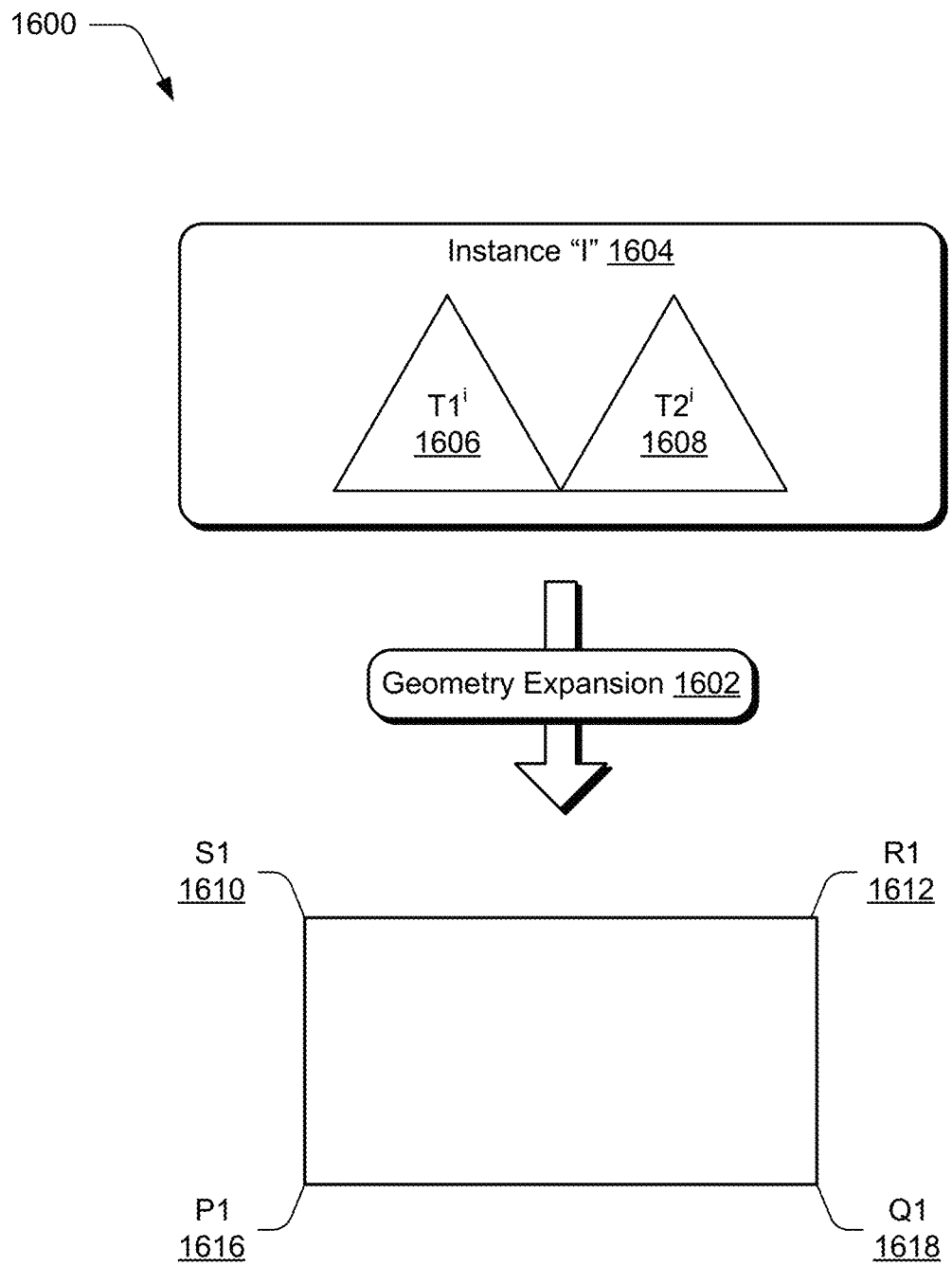
FIG. 16 depicts an example implementation of generating antialiasing spread through geometry expansion.

FIG. 16 depicts an example implementation 1600 of generating antialiasing spread through geometry expansion 1602. In this example, a vertex shader 302 stage of the graphics pipeline 132 on the graphics processing unit 106 computes a rectangle which encloses a control triangle completely and then expands a side of the rectangle in a direction based on convexity of the curve as described in relation to FIG. 8.

The distance of expansion is the same for each curve and predefined in a pixel space. This distance is variable based on the rendering fidelity desired and resolution of the rendering device. Although the points are in pixel space, there are several mechanisms to place the points to cover a complete area of input triangles and have additional pixels around the triangle for proper antialiasing in any direction.

For each vertex shader invocation, the vertex shader 302 obtains data defining the three vertices of the input triangle given the following inputs:
Triangle with vertices A,B and C
Matrix to transform input vertices to pixel space: M
Offset distance: D (in pixel units)
Each vertex shader invocation for an instance "I" 1604 for primitives "T1'" 1606 and "T2'" 1608, a geometry expansion 1602 "Ti(A,B,C), D, M" is computed for position coordinates for each vertex "S1" 1610, "R1" 1612, "P1 1616, and Q1" 1618 and then selectively picks a vertex coordinates based on vertex ID.

FIG. 17 depicts an example implementation 1700 of computing position coordinates for each vertex as part of geometry expansion as shown in FIG. 16. The vertex shader is also configured to compute additional information for each vertex such as barycentric coordinates, convexity attributes, texture coordinates, primitive classifiers such as line vs degenerate curve classification. Once the antialiasing spread is computed for the vector path, the fragment shader 306 processes the rasterization 304. The fragment shader 306, for instance, computes a signed distance of each fragment in the rasterization 304 from a bounding Bezier/curve and alpha modulates a color of the curve based on signed distance.

Figure 18:
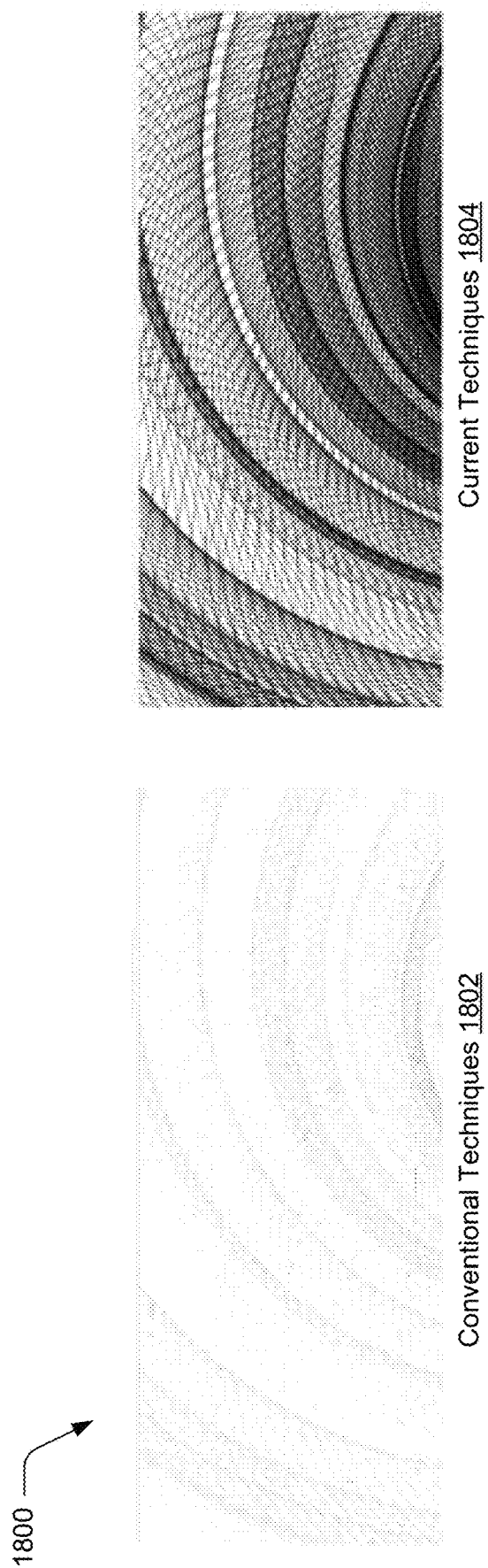
FIG. 18 depicts an example of a rendering result of conventional techniques contrasted with current techniques described herein.

FIG. 18 depicts an example 1800 of a rendering result of conventional techniques 1802 contrasted with current techniques 1804 described herein. In this way, the techniques described herein achieve full resolution independence without compromise in perform or memory usage. These techniques result in lower memory usage as a result of optimization of vertex buffer storage and subsequent lead to reduced data transfer time between the central processing unit 104 and the graphics processing unit 106. Further, these techniques are configured for use with a browser, which is not possible in conventional techniques.

Example System and Device

Figure 19:
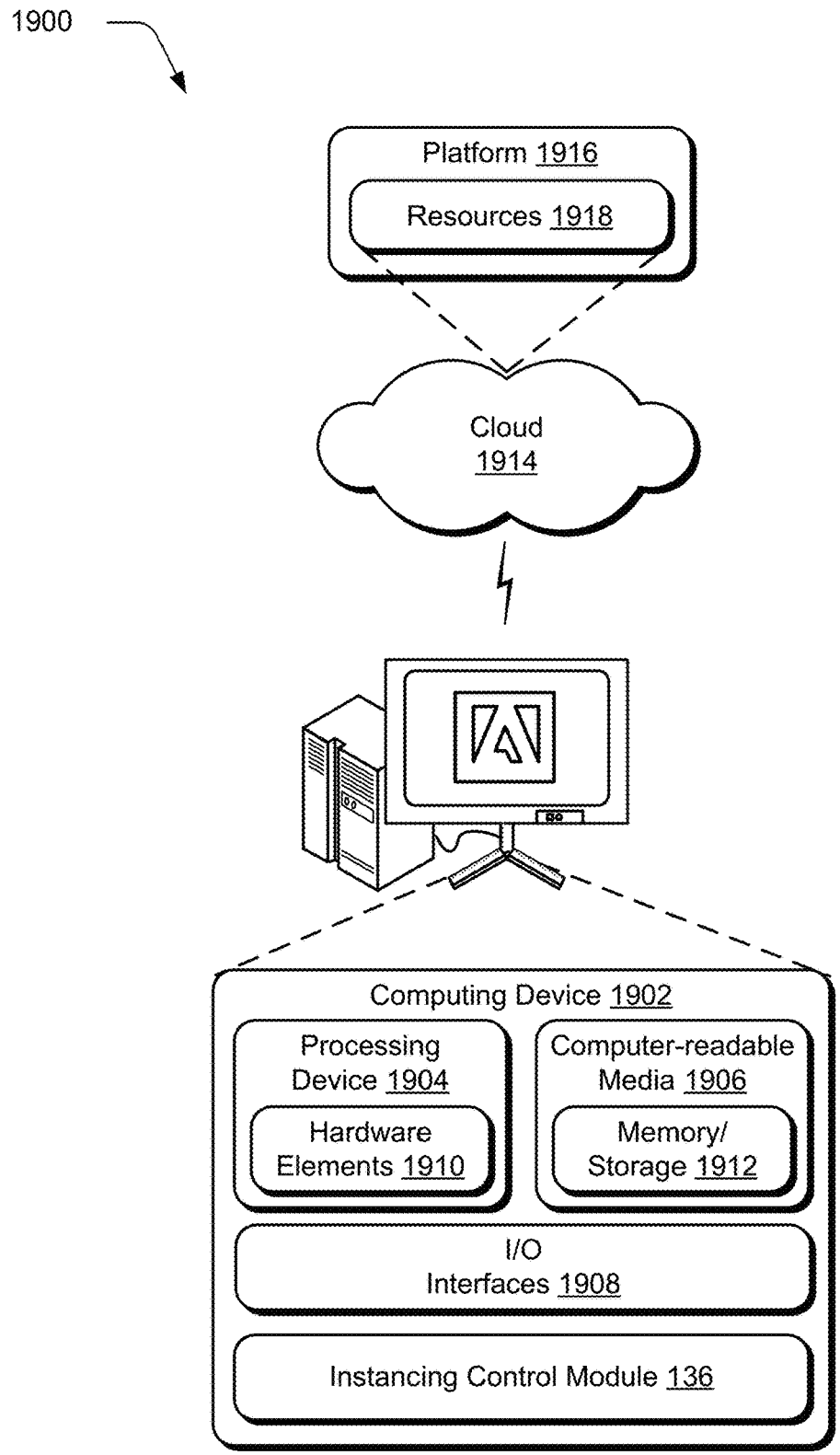
FIG. 19 illustrates an example system that includes an example computing device that is representative of one or more computing systems and/or devices that implement the various techniques described herein.

FIG. 19 illustrates an example system generally at 1900 that includes an example computing device 1902 that is representative of one or more computing systems and/or devices that implement the various techniques described herein. This is illustrated through inclusion of the instancing control module 136. The computing device 1902 is configurable, for example, as a server of a service provider, a device associated with a client (e.g., a client device), an on-chip system, and/or any other suitable computing device or computing system.

The example computing device 1902 as illustrated includes a processing device 1904, one or more computer-readable media 1906, and one or more I/O interface 1908 that are communicatively coupled, one to another. Although not shown, the computing device 1902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 1904 is representative of functionality to perform one or more operations using hardware. Accordingly, the processing device 1904 is illustrated as including hardware element 1910 that is configurable as processors, functional blocks, and so forth. This includes implementation in hardware as an application specific integrated circuit or other logic device formed using one or more semiconductors. The hardware elements 1910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1906 is illustrated as including memory/storage 1912. The memory/storage 1912 represents memory/storage capacity associated with one or more computer-readable media. The memory/storage 1912 includes volatile media (such as random access memory (RAM)) and/or nonvolatile media (such as read only memory (ROM), Flash memory, optical disks, magnetic disks, and so forth). The memory/storage 1912 includes fixed media (e.g., RAM, ROM, a fixed hard drive, and so on) as well as removable media (e.g., Flash memory, a removable hard drive, an optical disc, and so forth). The computer-readable media 1906 is configurable in a variety of other ways as further described below.

Input/output interface(s) 1908 are representative of functionality to allow a user to enter commands and information to computing device 1902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1902. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1910 and computer-readable media 1906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1910. The computing device 1902 is configured to implement particular instructions and/or functions corresponding to the software and/or hardware modules. Accordingly, implementation of a module that is executable by the computing device 1902 as software is achieved at least partially in hardware, e.g., through use of computer-readable storage media and/or hardware elements 1910 of the processing device 1904. The instructions and/or functions are executable/operable by one or more articles of manufacture (for example, one or more computing devices 1902 and/or processing devices 1904) to implement techniques, modules, and examples described herein.

The techniques described herein are supported by various configurations of the computing device 1902 and are not limited to the specific examples of the techniques described herein. This functionality is also implementable all or in part through use of a distributed system, such as over a "cloud" 1914 via a platform 1916 as described below.

The cloud 1914 includes and/or is representative of a platform 1916 for resources 1918. The platform 1916 abstracts underlying functionality of hardware (e.g., servers) and software resources of the cloud 1914. The resources 1918 include applications and/or data that can be utilized while computer processing is executed on servers that are remote from the computing device 1902. Resources 1918 can also include services provided over the Internet and/or through a subscriber network, such as a cellular or Wi-Fi network.

The platform 1916 abstracts resources and functions to connect the computing device 1902 with other computing devices. The platform 1916 also serves to abstract scaling of resources to provide a corresponding level of scale to encountered demand for the resources 1918 that are implemented via the platform 1916. Accordingly, in an interconnected device embodiment, implementation of functionality described herein is distributable throughout the system 1900. For example, the functionality is implementable in part on the computing device 1902 as well as via the platform 1916 that abstracts the functionality of the cloud 1914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   forming, by a processing device, polygons by tessellating a digital object for rendering the digital object at a second resolution corresponding to a second zoom level different than a first resolution of the digital object corresponding to a first zoom level;
   defining, by the processing device, a plurality of primitives for each of the polygons;
   determining, by the processing device, a processing order for a plurality of instances, the forming including grouping respective said primitives that correspond to respective said polygons together in respective said instances; and
   invoking, by the processing device, the plurality of instances arranged according to the processing order to cause rendering the plurality of primitives by a graphics processing unit such that a first polygon, a second polygon and a third polygon of the polygons are rendered in a z order with the second polygon overlapping the first polygon and the third polygon overlapping the second polygon, the first polygon, the second polygon and the third polygon respectively corresponding to a first instance, a second instance and a third instance of the plurality of instances arranged according to the processing order, the polygons, including the first polygon, the second polygon, and the third polygon, forming at least a portion of the digital object at the second resolution corresponding to the second zoom level different than the first resolution of the digital object corresponding to the first zoom level.

2. The method as described in claim 1, wherein the defining forms an antialiasing spread for the polygons of the digital object.

3. The method as described in claim 1, wherein the defining includes expanding each of the polygons formed as triangles into the plurality of primitives formed as triangles through geometry amplification.

4. The method as described in claim 1, wherein the digital object is a Bezier curve or a vector object.

5. The method as described in claim 1, wherein the defining defines the plurality of primitives using coordinate positions and respective colors in a vertex buffer.

6. The method as described in claim 5, wherein the vertex buffer is accessible to the graphics processing unit.

7. The method as described in claim 1, further comprising detecting whether the polygons formed from tessellating the digital object are interior triangles or control triangles of the digital object and wherein the forming is performed for the polygons that are control triangles.

8. The method as described in claim 1, wherein the invoking is performed as a batch that includes the plurality of instances using a single draw call.

9. The method as described in claim 1, wherein the rendering is performed by the graphics processing unit to a frame buffer.

10. A system comprising:
    a central processing unit configured to perform operations for rendering a digital object at a second resolution corresponding to a second zoom level different than a first resolution of the digital object corresponding to a first zoom level, the operations including:
       determining a processing order for a plurality of instances by grouping primitives that correspond to respective polygons together in respective said instances; and
       invoking a single draw call including the plurality of instances arranged according to the processing order;
    a graphics processing unit configured to, responsive to the single draw call, render the primitives to a frame buffer in the processing order for the plurality of instances such that a first polygon, a second polygon and a third polygon of the polygons are rendered in a z order with the second polygon overlapping the first polygon and the third polygon overlapping the second polygon, the first polygon, the second polygon and the third polygon respectively corresponding to a first instance, a second instance and a third instance of the plurality of instances arranged according to the processing order, the polygons, including the first polygon, the second polygon, and the third polygon, forming at least a portion of the digital object at the second resolution corresponding to the second zoom level different than the first resolution of the digital object corresponding to the first zoom level; and
    the frame buffer.

11. The system as described in claim 10, wherein the determining and the invoking are performed as part of executing a browser by the central processing unit.

12. The system as described in claim 10, wherein the central processing unit is further configured to perform operations including forming the respective polygons by tessellating a digital object and defining the primitives for each of the respective polygons.

13. The system as described in claim 12, wherein the defining forms an antialiasing spread for the respective polygons of the digital object.

14. The system as described in claim 12, wherein the defining includes expanding the respective polygons formed as triangles into the plurality of primitives formed as triangles through geometry amplification.

15. The system as described in claim 10, wherein the central processing unit is further configured to form the respective polygons by tessellating a digital object.

16. The system as described in claim 15, wherein the digital object is a Bezier curve or a vector object.

17. The system as described in claim 15, wherein the graphics processing unit is configured to render the primitives using a vertex shader and a fragment shader.

18. One or more computer-readable storage media storing instructions that, responsive to execution by a processing device, causes the processing device to perform operations including:
    forming polygons by tessellating a vector object for rendering the vector object at a second resolution corresponding to a second zoom level different than a first resolution of the vector object corresponding to a first zoom level;
    generating an antialiasing spread by defining a plurality of primitives for each of the polygons;

determining a processing order by grouping said primitives that correspond to respective said polygons together in respective instances of a plurality of instances; and invoking a single draw call to a graphics processing unit to render the vector object, the single draw call including the plurality of instances arranged according to the processing order such that a first polygon, a second polygon and a third polygon of the polygons are rendered in a z order with the second polygon overlapping the first polygon and the third polygon overlapping the second polygon, the first polygon, the second polygon and the third polygon respectively corresponding to a first instance, a second instance and a third instance of the plurality of instances arranged according to the processing order, the polygons, including the first polygon, the second polygon, and the third polygon, forming at least a portion of the vector object at the second resolution corresponding to the second zoom level different than the first resolution of the vector object corresponding to the first zoom level.

19. The one or more computer-readable storage media as described in claim 18, wherein the operations are executable using a browser.

20. The one or more computer-readable storage media as described in claim 18, the operations further comprising detecting whether the polygons formed from tessellating the vector object are interior triangles or control triangles and wherein the generating is performed for the polygons that are control triangles.

* * * * *